(12) United States Patent
Abhyanker

(10) Patent No.: US 9,971,985 B2
(45) Date of Patent: May 15, 2018

(54) TRAIN BASED COMMUNITY

(71) Applicant: Raj Abhyanker, Cupertino, CA (US)

(72) Inventor: Raj Abhyanker, Cupertino, CA (US)

( * ) Notice: Subject to any disclaimer, the term of this patent is extended or adjusted under 35 U.S.C. 154(b) by 968 days.

(21) Appl. No.: 14/309,910

(22) Filed: Jun. 20, 2014

(65) Prior Publication Data

US 2015/0371178 A1    Dec. 24, 2015

(51) Int. Cl.
*G06Q 10/08* (2012.01)
*B61L 27/04* (2006.01)
*B61L 3/16* (2006.01)
*B61L 23/04* (2006.01)

(52) U.S. Cl.
CPC ............. *G06Q 10/083* (2013.01); *B61L 3/16* (2013.01); *B61L 23/041* (2013.01); *B61L 27/04* (2013.01)

(58) Field of Classification Search
CPC ..... G06Q 10/083; B61L 23/041; B61L 27/04; B61L 3/16
See application file for complete search history.

(56) References Cited

U.S. PATENT DOCUMENTS

| | | |
|---|---|---|
| 2,035,218 A | 3/1936 | Bloom |
| 3,253,806 A | 5/1966 | Eickmann |
| 3,556,438 A | 1/1971 | Meditz |
| 3,762,669 A | 10/1973 | Curci |
| 4,119,163 A | 10/1978 | Ball |
| 4,161,843 A | 7/1979 | Hui |
| 4,375,354 A | 3/1983 | Henriksson |
| 4,556,198 A | 12/1985 | Tominaga |
| 4,671,186 A | 6/1987 | Kunczynski |
| 4,779,203 A | 10/1988 | McClure et al. |
| 4,914,605 A | 4/1990 | Loughmiller, Jr. et al. |
| 4,996,468 A | 2/1991 | Field et al. |
| 5,050,844 A | 9/1991 | Hawk |
| 5,199,686 A | 4/1993 | Fletcher |
| 5,208,750 A | 5/1993 | Kurami et al. |
| 5,325,294 A | 6/1994 | Keene |

(Continued)

FOREIGN PATENT DOCUMENTS

| | | |
|---|---|---|
| EP | 1426876 A1 | 6/2004 |
| KR | 101069834 B1 | 10/2010 |

(Continued)

OTHER PUBLICATIONS

"Crowdsourcing: Those that are willing to test & learn will be those that will win", Newsline, Mar. 1, 2011 by Neil Perkin http://mediatel.co.uk/newsline/2011/03/01/crowdsourcing-those-that-are-willing-to-test-learn-will-be-those-that-will-win/.

(Continued)

*Primary Examiner* — Khoi H Tran
*Assistant Examiner* — Majdi Alsomiri
(74) *Attorney, Agent, or Firm* — Raj Abhyanker, P.C.

(57) ABSTRACT

Disclosed are a method and a system of a train based community, according to one embodiment. In one embodiment, a method includes forming a train track adjacent to a set of homes in a residential community, placing a boarding location in a property boundary of each one of the set of homes in the residential community, and routing the train track to a merchant in the residential community. A shopping cart is autonomously routed from at least one boarding location of the property boundary to the merchant based on a request of an occupier of a home associated with the property boundary.

19 Claims, 9 Drawing Sheets

PROCESS FLOW
950

(56) References Cited

U.S. PATENT DOCUMENTS

| | | |
|---|---|---|
| 5,372,211 A | 12/1994 | Wilcox et al. |
| 5,521,817 A | 5/1996 | Burdoin et al. |
| 5,577,567 A | 11/1996 | Johnson et al. |
| 5,581,630 A | 12/1996 | Bonneau, Jr. |
| 5,590,062 A | 12/1996 | Nagamitsu et al. |
| 5,617,319 A | 4/1997 | Arakawa et al. |
| 5,630,103 A | 5/1997 | Smith et al. |
| 5,671,342 A | 9/1997 | Millier et al. |
| 5,720,363 A | 2/1998 | Kipp |
| 5,751,245 A | 5/1998 | Janky et al. |
| 5,774,133 A | 6/1998 | Neave et al. |
| 5,794,207 A | 8/1998 | Walker et al. |
| 5,805,810 A | 9/1998 | Maxwell |
| 5,819,269 A | 10/1998 | Uomini |
| 5,826,244 A | 10/1998 | Huberman |
| 5,831,664 A | 11/1998 | Wharton et al. |
| 5,835,896 A | 11/1998 | Fisher et al. |
| 5,838,566 A * | 11/1998 | Conboy .............. G06Q 10/08 700/112 |
| 5,852,810 A | 12/1998 | Sotiroff et al. |
| 5,904,214 A | 5/1999 | Lin |
| 5,905,499 A | 5/1999 | McDowall et al. |
| 5,907,322 A | 5/1999 | Kelly et al. |
| 5,926,765 A | 7/1999 | Sasaki |
| 5,930,474 A | 7/1999 | Dunworth et al. |
| 5,937,413 A | 8/1999 | Hyun et al. |
| 5,940,806 A | 8/1999 | Danial |
| 5,991,737 A | 11/1999 | Chen |
| 6,024,288 A | 2/2000 | Gottlich et al. |
| 6,029,141 A | 2/2000 | Bezos et al. |
| 6,029,195 A | 2/2000 | Herz |
| 6,034,618 A | 3/2000 | Tatebayashi et al. |
| 6,036,601 A | 3/2000 | Heckel |
| 6,047,194 A | 4/2000 | Andersson |
| 6,047,236 A | 4/2000 | Hancock et al. |
| 6,049,778 A | 4/2000 | Walker et al. |
| 6,059,092 A * | 5/2000 | Jerue .............. B65G 1/1373 198/364 |
| 6,059,263 A | 5/2000 | Otema et al. |
| 6,073,138 A | 6/2000 | de l'Etraz et al. |
| 6,078,906 A | 6/2000 | Huberman |
| 6,088,702 A | 7/2000 | Plantz et al. |
| 6,092,076 A | 7/2000 | McDonough et al. |
| 6,092,105 A | 7/2000 | Goldman |
| 6,101,484 A | 8/2000 | Halbert et al. |
| 6,108,639 A | 8/2000 | Walker et al. |
| 6,122,592 A | 9/2000 | Arakawa et al. |
| 6,134,486 A | 10/2000 | Kanayama |
| 6,148,260 A | 11/2000 | Musk et al. |
| 6,148,289 A | 11/2000 | Virdy |
| 6,175,831 B1 | 1/2001 | Weinreich et al. |
| 6,199,076 B1 | 3/2001 | Logan et al. |
| 6,229,533 B1 | 5/2001 | Farmer et al. |
| 6,236,990 B1 | 5/2001 | Geller et al. |
| 6,269,369 B1 | 7/2001 | Robertson |
| 6,308,177 B1 | 10/2001 | Israni et al. |
| 6,317,718 B1 | 11/2001 | Fano |
| 6,336,111 B1 | 1/2002 | Ashby et al. |
| 6,339,745 B1 | 1/2002 | Novik |
| 6,356,834 B2 | 3/2002 | Hancock et al. |
| 6,381,537 B1 | 4/2002 | Chenault et al. |
| 6,401,085 B1 | 6/2002 | Gershman et al. |
| 6,405,123 B1 | 6/2002 | Rennard et al. |
| 6,408,307 B1 | 6/2002 | Semple et al. |
| 6,445,983 B1 | 9/2002 | Dickson et al. |
| 6,453,339 B1 | 9/2002 | Schultz et al. |
| 6,470,268 B1 | 10/2002 | Ashcraft et al. |
| 6,480,885 B1 | 11/2002 | Olivier |
| 6,487,583 B1 | 11/2002 | Harvey et al. |
| 6,498,982 B2 | 12/2002 | Bellesfield et al. |
| 6,507,776 B1 | 1/2003 | Fox, III |
| 6,513,069 B1 | 1/2003 | Abato et al. |
| 6,519,629 B2 | 2/2003 | Harvey et al. |
| 6,532,007 B1 | 3/2003 | Matsuda |
| 6,542,813 B1 | 4/2003 | Kovacs |
| 6,542,817 B2 | 4/2003 | Miyaki |
| 6,542,936 B1 | 4/2003 | Mayle et al. |
| 6,557,013 B1 | 4/2003 | Ziff et al. |
| 6,587,787 B1 | 7/2003 | Yokota |
| 6,600,418 B2 | 7/2003 | Francis et al. |
| 6,611,751 B2 | 8/2003 | Warren |
| 6,615,039 B1 | 9/2003 | Eldering |
| 6,622,086 B2 | 9/2003 | Polidi |
| 6,633,311 B1 | 10/2003 | Douvikas et al. |
| 6,636,803 B1 | 10/2003 | Hartz, Jr. et al. |
| 6,640,187 B1 | 10/2003 | Chenault et al. |
| 6,643,663 B1 | 11/2003 | Dabney et al. |
| 6,646,568 B2 | 11/2003 | MacPhail et al. |
| 6,647,383 B1 | 11/2003 | August et al. |
| 6,658,410 B1 | 12/2003 | Sakamaki et al. |
| 6,662,016 B1 | 12/2003 | Buckham et al. |
| 6,672,601 B1 | 1/2004 | Hofheins et al. |
| 6,677,894 B2 | 1/2004 | Sheynblat et al. |
| 6,687,878 B1 | 2/2004 | Eintracht et al. |
| 6,691,105 B1 | 2/2004 | Virdy |
| 6,691,114 B1 | 2/2004 | Nakamura |
| 6,711,414 B1 | 3/2004 | Lightman et al. |
| 6,716,101 B1 | 4/2004 | Meadows et al. |
| 6,719,570 B2 | 4/2004 | Tsuchioka |
| 6,721,748 B1 | 4/2004 | Knight et al. |
| 6,728,635 B2 | 4/2004 | Hiroyuki Hamada et al. |
| 6,745,196 B1 | 6/2004 | Colyer et al. |
| 6,750,881 B1 | 6/2004 | Appelman |
| 6,798,407 B1 | 9/2004 | Benman |
| 6,816,850 B2 | 11/2004 | Culliss |
| 6,819,267 B1 | 11/2004 | Edmark et al. |
| 6,834,229 B2 | 12/2004 | Rafiah et al. |
| 6,847,823 B2 | 1/2005 | Lehikoinen et al. |
| 6,871,140 B1 | 3/2005 | Florance et al. |
| 6,882,307 B1 | 4/2005 | Gifford |
| 6,883,748 B2 | 4/2005 | Yoeli |
| 6,889,213 B1 | 5/2005 | Douvikas et al. |
| 6,907,405 B2 | 6/2005 | Brett |
| 6,918,576 B2 | 7/2005 | Finkbeiner |
| 6,926,233 B1 | 8/2005 | Corcoran, III |
| 6,931,419 B1 | 8/2005 | Lindquist |
| 6,950,791 B1 | 9/2005 | Bray et al. |
| 6,963,879 B2 | 11/2005 | Colver et al. |
| 6,968,179 B1 | 11/2005 | De Vries |
| 6,968,513 B1 | 11/2005 | Rinebold et al. |
| 6,974,123 B2 | 12/2005 | Latvys |
| 6,976,031 B1 | 12/2005 | Toupal et al. |
| 6,978,284 B2 | 12/2005 | McBrearty et al. |
| 6,983,139 B2 | 1/2006 | Dowling et al. |
| 6,987,976 B2 | 1/2006 | Kohar et al. |
| 7,006,881 B1 | 2/2006 | Hoffberg et al. |
| 7,013,292 B1 | 3/2006 | Hsu et al. |
| 7,024,397 B1 | 4/2006 | Donahue |
| 7,024,455 B2 | 4/2006 | Yokobori et al. |
| 7,038,681 B2 | 5/2006 | Scott et al. |
| 7,047,202 B2 | 5/2006 | Jaipuria et al. |
| 7,050,909 B2 | 5/2006 | Nichols et al. |
| 7,068,309 B2 | 6/2006 | Toyama et al. |
| 7,069,308 B2 | 6/2006 | Abrams |
| 7,072,849 B1 | 7/2006 | Filepp et al. |
| 7,079,943 B2 | 7/2006 | Flann et al. |
| 7,080,019 B1 | 7/2006 | Hurzeler |
| 7,080,096 B1 | 7/2006 | Imamura |
| 7,099,745 B2 | 8/2006 | Ebert |
| 7,099,862 B2 | 8/2006 | Fitzpatrick et al. |
| 7,117,254 B2 | 10/2006 | Lunt et al. |
| 7,130,702 B2 | 10/2006 | Morrell |
| 7,136,915 B2 | 11/2006 | Rieger, III |
| 7,155,336 B2 | 12/2006 | Dorfman et al. |
| 7,158,878 B2 | 1/2007 | Rasmussen et al. |
| 7,177,872 B2 | 2/2007 | Schwesig et al. |
| 7,178,720 B1 | 2/2007 | Strubbe et al. |
| 7,184,990 B2 | 2/2007 | Walker et al. |
| 7,188,056 B2 | 3/2007 | Kagarlis |
| 7,188,080 B1 | 3/2007 | Walker et al. |
| 7,188,153 B2 | 3/2007 | Lunt et al. |
| 7,209,803 B2 | 4/2007 | Okamoto et al. |
| 7,218,993 B2 | 5/2007 | Yasukawa et al. |
| 7,228,232 B2 | 6/2007 | Bodin et al. |

(56) References Cited

U.S. PATENT DOCUMENTS

| | | | |
|---|---|---|---|
| 7,233,942 B2 | 6/2007 | Nye |
| 7,249,123 B2 | 7/2007 | Elder et al. |
| 7,249,732 B2 | 7/2007 | Sanders, Jr. et al. |
| 7,251,647 B2 | 7/2007 | Hoblit |
| 7,254,559 B2 | 8/2007 | Florance et al. |
| 7,269,590 B2 | 9/2007 | Hull et al. |
| 7,293,019 B2 | 11/2007 | Dumais et al. |
| 7,296,026 B2 | 11/2007 | Patrick et al. |
| 7,306,186 B2 | 12/2007 | Kusic |
| 7,324,810 B2 | 1/2008 | Nave et al. |
| 7,343,564 B2 | 3/2008 | Othmer |
| 7,353,034 B2 | 4/2008 | Haney |
| 7,353,114 B1 | 4/2008 | Rohlf et al. |
| 7,353,199 B1 | 4/2008 | Distefano, III |
| 7,359,871 B1 | 4/2008 | Paasche et al. |
| 7,359,894 B1 | 4/2008 | Liebman et al. |
| 7,373,244 B2 | 5/2008 | Kreft |
| 7,375,618 B2 | 5/2008 | Quintos |
| 7,383,251 B2 | 6/2008 | Might |
| 7,386,542 B2 | 6/2008 | Maybury et al. |
| 7,389,210 B2 | 6/2008 | Kagarlis |
| 7,424,438 B2 | 9/2008 | Vianello |
| 7,424,541 B2 | 9/2008 | Bourne |
| 7,426,970 B2 | 9/2008 | Olsen |
| 7,433,832 B1 | 10/2008 | Bezos et al. |
| 7,433,868 B1 | 10/2008 | Satomi et al. |
| 7,437,368 B1 | 10/2008 | Kolluri et al. |
| 7,441,031 B2 | 10/2008 | Shrinivasan et al. |
| 7,444,241 B2 | 10/2008 | Grimm |
| 7,447,509 B2 | 11/2008 | Cossins et al. |
| 7,447,685 B2 | 11/2008 | Nye |
| 7,447,771 B1 | 11/2008 | Taylor |
| 7,454,524 B2 | 11/2008 | Jeong |
| 7,475,953 B2 | 1/2009 | Osborn et al. |
| 7,477,285 B1 | 1/2009 | Johnson |
| 7,478,324 B1 | 1/2009 | Ohtsu |
| 7,480,867 B1 | 1/2009 | Racine et al. |
| 7,483,960 B2 | 1/2009 | Kyusojin |
| 7,487,114 B2 | 2/2009 | Florance et al. |
| 7,496,603 B2 | 2/2009 | Deguchi et al. |
| 7,500,258 B1 | 3/2009 | Eldering |
| 7,505,919 B2 | 3/2009 | Richardson |
| 7,505,929 B2 | 3/2009 | Angert et al. |
| 7,520,466 B2 | 4/2009 | Bostan |
| 7,525,276 B2 | 4/2009 | Eaton |
| 7,561,169 B2 | 7/2009 | Carroll |
| 7,562,023 B2 | 7/2009 | Yamamoto |
| 7,580,862 B1 | 8/2009 | Montelo et al. |
| 7,581,702 B2 | 9/2009 | Olson et al. |
| 7,587,276 B2 | 9/2009 | Gold et al. |
| 7,596,511 B2 | 9/2009 | Hall et al. |
| 7,599,795 B1 | 10/2009 | Blumberg et al. |
| 7,599,935 B2 | 10/2009 | La Rotonda et al. |
| 7,617,048 B2 | 11/2009 | Simon et al. |
| 7,636,687 B2 | 12/2009 | Foster et al. |
| 7,640,204 B2 | 12/2009 | Florance et al. |
| 7,658,346 B2 | 2/2010 | Goossen |
| 7,668,405 B2 | 2/2010 | Gallagher |
| 7,669,123 B2 | 2/2010 | Zuckerberg et al. |
| 7,680,673 B2 | 3/2010 | Wheeler |
| 7,680,859 B2 | 3/2010 | Schiller |
| 7,693,745 B1 * | 4/2010 | Pomerantz ............ G06Q 10/08 705/26.5 |
| 7,693,953 B2 | 4/2010 | Middleton et al. |
| 7,702,545 B1 | 4/2010 | Compton et al. |
| 7,725,492 B2 | 5/2010 | Sittig et al. |
| 7,734,254 B2 | 6/2010 | Frost et al. |
| 7,761,789 B2 | 7/2010 | Erol et al. |
| 7,792,815 B2 | 9/2010 | Aravamudan et al. |
| 7,797,256 B2 | 9/2010 | Zuckerberg et al. |
| 7,801,542 B1 | 9/2010 | Stewart |
| 7,802,290 B1 | 9/2010 | Bansal et al. |
| 7,808,378 B2 | 10/2010 | Hayden |
| 7,809,709 B1 | 10/2010 | Harrison, Jr. |
| 7,809,805 B2 | 10/2010 | Stremel et al. |
| 7,810,037 B1 | 10/2010 | Edwards et al. |
| 7,812,717 B1 | 10/2010 | Cona et al. |
| 7,823,073 B2 | 10/2010 | Holmes et al. |
| 7,827,052 B2 | 11/2010 | Scott et al. |
| 7,827,120 B1 | 11/2010 | Evans et al. |
| 7,827,208 B2 | 11/2010 | Bosworth et al. |
| 7,827,265 B2 | 11/2010 | Cheever et al. |
| 7,831,917 B1 | 11/2010 | Karam |
| 7,840,224 B2 | 11/2010 | Vengroff et al. |
| 7,840,319 B2 | 11/2010 | Zhong |
| 7,840,558 B2 | 11/2010 | Wiseman et al. |
| 7,853,518 B2 | 12/2010 | Cagan |
| 7,853,563 B2 | 12/2010 | Alvarado et al. |
| 7,860,889 B1 | 12/2010 | Martino et al. |
| 7,870,199 B2 | 1/2011 | Galli et al. |
| 7,873,471 B2 | 1/2011 | Gieseke |
| 7,881,864 B2 | 2/2011 | Smith |
| 7,886,024 B2 | 2/2011 | Kelly et al. |
| 7,894,933 B2 | 2/2011 | Mountz et al. |
| 7,894,939 B2 | 2/2011 | Zini et al. |
| 7,894,981 B2 | 2/2011 | Yamane et al. |
| 7,904,366 B2 | 3/2011 | Pogust |
| 7,933,808 B2 | 4/2011 | Garcia |
| 7,933,810 B2 | 4/2011 | Morgenstern |
| 7,945,653 B2 | 5/2011 | Zuckerberg et al. |
| 7,949,714 B1 | 5/2011 | Burnim |
| 7,958,011 B1 | 6/2011 | Cretney et al. |
| 7,961,986 B1 | 6/2011 | Jing et al. |
| 7,962,281 B2 | 6/2011 | Rasmussen et al. |
| 7,966,567 B2 | 6/2011 | Abhyanker |
| 7,969,606 B2 | 6/2011 | Chu |
| 7,970,657 B2 | 6/2011 | Morgenstern |
| 7,980,808 B2 | 7/2011 | Chilson et al. |
| 7,991,703 B1 | 8/2011 | Watkins |
| 7,996,109 B2 | 8/2011 | Zini et al. |
| 8,010,230 B2 | 8/2011 | Zini et al. |
| 8,027,943 B2 | 9/2011 | Juan et al. |
| 8,046,309 B2 | 10/2011 | Evans et al. |
| 8,051,089 B2 | 11/2011 | Gargi et al. |
| 8,060,389 B2 | 11/2011 | Johnson |
| 8,060,555 B2 | 11/2011 | Grayson et al. |
| 8,064,590 B2 | 11/2011 | Abhyanker |
| 8,065,291 B2 | 11/2011 | Knorr |
| 8,103,734 B2 | 1/2012 | Galli et al. |
| 8,107,879 B2 | 1/2012 | Pering et al. |
| 8,112,419 B2 | 2/2012 | Hancock et al. |
| 8,117,486 B2 | 2/2012 | Handley |
| 8,136,145 B2 | 3/2012 | Fetterman et al. |
| 8,139,514 B2 | 3/2012 | Weber et al. |
| 8,145,703 B2 | 3/2012 | Frishert et al. |
| 8,149,113 B2 | 4/2012 | Diem |
| 8,167,234 B1 | 5/2012 | Moore |
| 8,171,128 B2 | 5/2012 | Zuckerberg et al. |
| 8,190,476 B2 | 5/2012 | Urbanski et al. |
| 8,195,601 B2 | 6/2012 | Law et al. |
| 8,195,744 B2 | 6/2012 | Julia et al. |
| 8,204,624 B2 | 6/2012 | Zini et al. |
| 8,204,776 B2 | 6/2012 | Abhyanker |
| 8,204,952 B2 | 6/2012 | Stremel et al. |
| 8,223,012 B1 | 7/2012 | Diem |
| 8,225,376 B2 | 7/2012 | Zuckerberg et al. |
| 8,229,470 B1 | 7/2012 | Ranjan et al. |
| 8,249,943 B2 | 8/2012 | Zuckerberg et al. |
| 8,253,557 B2 | 8/2012 | Ani et al. |
| 8,271,057 B2 | 9/2012 | Levine et al. |
| 8,275,546 B2 | 9/2012 | Xiao et al. |
| 8,290,943 B2 | 10/2012 | Carbone et al. |
| 8,292,215 B2 | 10/2012 | Olm et al. |
| 8,296,373 B2 | 10/2012 | Bosworth et al. |
| 8,301,743 B2 | 10/2012 | Curran et al. |
| 8,315,389 B2 | 11/2012 | Qiu et al. |
| 8,326,091 B1 | 12/2012 | Jing et al. |
| 8,326,315 B2 | 12/2012 | Phillips et al. |
| 8,328,130 B2 | 12/2012 | Goossen |
| 8,352,183 B2 | 1/2013 | Thota et al. |
| 8,364,757 B2 | 1/2013 | Scott et al. |
| 8,370,003 B2 | 2/2013 | So et al. |
| 8,380,382 B2 | 2/2013 | Sung et al. |
| 8,380,638 B1 | 2/2013 | Watkins |

(56) References Cited

U.S. PATENT DOCUMENTS

| | | |
|---|---|---|
| 8,391,789 B2 | 3/2013 | Palin et al. |
| 8,391,909 B2 | 3/2013 | Stewart |
| 8,401,771 B2 | 3/2013 | Krumm et al. |
| 8,402,094 B2 | 3/2013 | Bosworth et al. |
| 8,402,372 B2 | 3/2013 | Gillespie et al. |
| 8,412,576 B2 | 4/2013 | Urbanski |
| 8,412,675 B2 | 4/2013 | Alvarado et al. |
| 8,427,308 B1 | 4/2013 | Baron, Sr. et al. |
| 8,428,565 B2 | 4/2013 | Middleton et al. |
| 8,433,650 B1 | 4/2013 | Thomas |
| 8,438,156 B2 | 5/2013 | Redstone et al. |
| 8,442,923 B2 | 5/2013 | Gross |
| 8,443,107 B2 | 5/2013 | Burdette et al. |
| 8,447,810 B2 | 5/2013 | Roumeliotis et al. |
| 8,463,764 B2 | 6/2013 | Fujioka et al. |
| 8,473,199 B2 | 6/2013 | Blumberg et al. |
| 8,493,849 B2 | 7/2013 | Fuste Vilella et al. |
| 8,504,284 B2 | 8/2013 | Brülle-Drews et al. |
| 8,504,512 B2 | 8/2013 | Herzog et al. |
| 8,510,268 B1 | 8/2013 | Laforge et al. |
| 8,521,656 B2 | 8/2013 | Zimberoff et al. |
| 8,538,458 B2 | 9/2013 | Haney |
| 8,543,143 B2 | 9/2013 | Chandra et al. |
| 8,543,323 B1 | 9/2013 | Gold et al. |
| 8,548,493 B2 | 10/2013 | Rieger, III |
| 8,554,770 B2 | 10/2013 | Purdy |
| 8,554,852 B2 | 10/2013 | Burnim |
| 8,584,091 B2 | 11/2013 | Champion et al. |
| 8,589,330 B2 | 11/2013 | Petersen et al. |
| 8,594,715 B1 | 11/2013 | Stewart |
| 8,595,292 B2 | 11/2013 | Grayson et al. |
| 8,600,602 B1 | 12/2013 | McAndrew et al. |
| 8,615,565 B2 | 12/2013 | Randall |
| 8,620,532 B2 | 12/2013 | Curtis et al. |
| 8,620,827 B1 | 12/2013 | Watkins, III |
| 8,626,699 B2 | 1/2014 | Xie et al. |
| 8,627,506 B2 | 1/2014 | Vera et al. |
| 8,649,976 B2 | 2/2014 | Kreft |
| 8,650,103 B2 | 2/2014 | Wilf et al. |
| 8,655,873 B2 | 2/2014 | Mitchell et al. |
| 8,660,541 B1 | 2/2014 | Beresniewicz et al. |
| 8,666,660 B2 | 3/2014 | Sartipi et al. |
| 8,671,095 B2 | 3/2014 | Gross |
| 8,671,106 B1 | 3/2014 | Lee et al. |
| 8,688,594 B2 | 4/2014 | Thomas et al. |
| 8,694,605 B1 | 4/2014 | Burrell et al. |
| 8,695,919 B2 | 4/2014 | Shachor et al. |
| 8,712,441 B2 | 4/2014 | Haney |
| 8,713,055 B2 | 4/2014 | Callahan et al. |
| 8,713,143 B2 | 4/2014 | Centola et al. |
| 8,718,910 B2 | 5/2014 | Guéziec |
| 8,723,679 B2 | 5/2014 | Whisenant |
| 8,732,155 B2 | 5/2014 | Vegnaduzzo et al. |
| 8,732,219 B1 | 5/2014 | Ferries et al. |
| 8,732,846 B2 | 5/2014 | D'Angelo et al. |
| 8,775,405 B2 | 7/2014 | Gross |
| D710,454 S | 8/2014 | Barajas et al. |
| 8,794,566 B2 | 8/2014 | Hutson |
| 8,799,253 B2 | 8/2014 | Valliani et al. |
| 8,825,226 B1 | 9/2014 | Worley, III et al. |
| 8,832,556 B2 | 9/2014 | Steinberg |
| 9,230,387 B2* | 1/2016 | Stiernagle ............... G07F 9/023 |
| 9,256,852 B1* | 2/2016 | Myllymaki .......... G06Q 10/083 |
| 9,436,926 B2* | 9/2016 | Cousins ................ G06Q 10/087 |
| 9,520,012 B2* | 12/2016 | Stiernagle ............... G07F 9/023 |
| 9,674,812 B2* | 6/2017 | Skaaksrud ............ H04W 24/10 |
| 2001/0016795 A1 | 8/2001 | Bellinger |
| 2001/0020955 A1 | 9/2001 | Nakagawa et al. |
| 2001/0029426 A1 | 10/2001 | Hancock et al. |
| 2001/0036833 A1 | 11/2001 | Koshima et al. |
| 2001/0037721 A1 | 11/2001 | Hasegawa et al. |
| 2001/0042087 A1 | 11/2001 | Kephart et al. |
| 2001/0049616 A1 | 12/2001 | Khuzadi et al. |
| 2001/0049636 A1 | 12/2001 | Hudda et al. |
| 2002/0019739 A1 | 2/2002 | Juneau et al. |
| 2002/0023018 A1 | 2/2002 | Kleinbaum |
| 2002/0026388 A1 | 2/2002 | Roebuck |
| 2002/0029350 A1 | 3/2002 | Cooper et al. |
| 2002/0030689 A1 | 3/2002 | Eichel et al. |
| 2002/0038225 A1 | 3/2002 | Klasky et al. |
| 2002/0046131 A1 | 4/2002 | Boone et al. |
| 2002/0046243 A1 | 4/2002 | Morris et al. |
| 2002/0049617 A1 | 4/2002 | Lencki et al. |
| 2002/0059201 A1 | 5/2002 | Work |
| 2002/0059379 A1 | 5/2002 | Harvey et al. |
| 2002/0065691 A1 | 5/2002 | Twig et al. |
| 2002/0065739 A1 | 5/2002 | Florance et al. |
| 2002/0070967 A1 | 6/2002 | Tanner et al. |
| 2002/0072848 A1 | 6/2002 | Hamada et al. |
| 2002/0077060 A1 | 6/2002 | Lehikoinen et al. |
| 2002/0077901 A1 | 6/2002 | Katz |
| 2002/0078171 A1 | 6/2002 | Schneider |
| 2002/0087260 A1 | 7/2002 | Hancock et al. |
| 2002/0087506 A1 | 7/2002 | Reddy |
| 2002/0090996 A1 | 7/2002 | Maehiro |
| 2002/0091556 A1 | 7/2002 | Fiala et al. |
| 2002/0097267 A1 | 7/2002 | Dinan et al. |
| 2002/0099693 A1 | 7/2002 | Kofsky |
| 2002/0103813 A1 | 8/2002 | Frigon |
| 2002/0103892 A1 | 8/2002 | Rieger |
| 2002/0124009 A1 | 9/2002 | Hoblit |
| 2002/0124053 A1 | 9/2002 | Adams et al. |
| 2002/0130906 A1 | 9/2002 | Miyaki |
| 2002/0133292 A1 | 9/2002 | Miyaki |
| 2002/0143462 A1 | 10/2002 | Warren |
| 2002/0147638 A1 | 10/2002 | Banerjee et al. |
| 2002/0156782 A1 | 10/2002 | Rubert |
| 2002/0156917 A1 | 10/2002 | Nye |
| 2002/0160762 A1 | 10/2002 | Nave et al. |
| 2002/0161666 A1 | 10/2002 | Fraki et al. |
| 2002/0169662 A1 | 11/2002 | Claiborne |
| 2002/0184496 A1 | 12/2002 | Mitchell et al. |
| 2002/0188522 A1 | 12/2002 | McCall et al. |
| 2003/0004802 A1 | 1/2003 | Callegari |
| 2003/0005035 A1 | 1/2003 | Rodgers |
| 2003/0018521 A1 | 1/2003 | Kraft et al. |
| 2003/0023489 A1 | 1/2003 | McGuire et al. |
| 2003/0023586 A1 | 1/2003 | Knorr |
| 2003/0036958 A1 | 2/2003 | Warmus et al. |
| 2003/0036963 A1 | 2/2003 | Jacobson et al. |
| 2003/0055983 A1 | 3/2003 | Callegari |
| 2003/0061503 A1 | 3/2003 | Katz et al. |
| 2003/0063072 A1 | 4/2003 | Brandenberg et al. |
| 2003/0064705 A1 | 4/2003 | Desiderio |
| 2003/0065716 A1 | 4/2003 | Kyusojin |
| 2003/0069002 A1 | 4/2003 | Hunter et al. |
| 2003/0069693 A1 | 4/2003 | Snapp et al. |
| 2003/0078897 A1 | 4/2003 | Florance et al. |
| 2003/0088520 A1 | 5/2003 | Bohrer et al. |
| 2003/0145093 A1 | 7/2003 | Oren et al. |
| 2003/0154020 A1 | 8/2003 | Polidi |
| 2003/0154213 A1 | 8/2003 | Ahn |
| 2003/0158668 A1 | 8/2003 | Anderson |
| 2003/0165373 A1* | 9/2003 | Felder ..................... B23Q 7/10 414/331.07 |
| 2003/0177019 A1 | 9/2003 | Santos et al. |
| 2003/0177192 A1 | 9/2003 | Umeki et al. |
| 2003/0182222 A1 | 9/2003 | Rotman et al. |
| 2003/0200192 A1 | 10/2003 | Bell et al. |
| 2003/0218253 A1 | 11/2003 | Avanzino et al. |
| 2003/0222918 A1 | 12/2003 | Coulthard |
| 2003/0225632 A1 | 12/2003 | Tong et al. |
| 2003/0225833 A1 | 12/2003 | Pilat et al. |
| 2004/0003283 A1 | 1/2004 | Goodman et al. |
| 2004/0021584 A1 | 2/2004 | Hartz et al. |
| 2004/0024846 A1 | 2/2004 | Randall et al. |
| 2004/0030525 A1 | 2/2004 | Robinson et al. |
| 2004/0030741 A1 | 2/2004 | Wolton et al. |
| 2004/0054428 A1 | 3/2004 | Sheha et al. |
| 2004/0056762 A1 | 3/2004 | Rogers |
| 2004/0088177 A1 | 5/2004 | Travis et al. |
| 2004/0093650 A1* | 5/2004 | Martins ..................... B25J 5/007 180/167 |
| 2004/0109012 A1 | 6/2004 | Kraus et al. |

(56) References Cited

U.S. PATENT DOCUMENTS

| | | |
|---|---|---|
| 2004/0111302 A1 | 6/2004 | Falk et al. |
| 2004/0122570 A1 | 6/2004 | Sonoyama et al. |
| 2004/0122693 A1 | 6/2004 | Hatscher et al. |
| 2004/0128215 A1 | 7/2004 | Florance et al. |
| 2004/0135805 A1 | 7/2004 | Gottsacker et al. |
| 2004/0139034 A1 | 7/2004 | Farmer |
| 2004/0139049 A1 | 7/2004 | Hancock et al. |
| 2004/0145593 A1 | 7/2004 | Berkner et al. |
| 2004/0146199 A1 | 7/2004 | Berkner et al. |
| 2004/0148275 A1 | 7/2004 | Achlioptas |
| 2004/0153466 A1 | 8/2004 | Ziff et al. |
| 2004/0157648 A1 | 8/2004 | Lightman |
| 2004/0158488 A1 | 8/2004 | Johnson |
| 2004/0162064 A1 | 8/2004 | Himmelstein |
| 2004/0166878 A1 | 8/2004 | Erskine et al. |
| 2004/0167787 A1 | 8/2004 | Lynch et al. |
| 2004/0172280 A1 | 9/2004 | Fraki et al. |
| 2004/0186766 A1 | 9/2004 | Fellenstein et al. |
| 2004/0210661 A1 | 10/2004 | Thompson |
| 2004/0215517 A1 | 10/2004 | Chen et al. |
| 2004/0215559 A1 | 10/2004 | Rebenack et al. |
| 2004/0217884 A1 | 11/2004 | Samadani et al. |
| 2004/0217980 A1 | 11/2004 | Radburn et al. |
| 2004/0220903 A1 | 11/2004 | Shah et al. |
| 2004/0220906 A1 | 11/2004 | Gargi et al. |
| 2004/0230562 A1 | 11/2004 | Wysoczanski et al. |
| 2004/0236771 A1 | 11/2004 | Colver et al. |
| 2004/0243478 A1 | 12/2004 | Walker et al. |
| 2004/0257340 A1 | 12/2004 | Jawerth |
| 2004/0260604 A1 | 12/2004 | Bedingfield |
| 2004/0260677 A1 | 12/2004 | Malpani et al. |
| 2004/0267625 A1 | 12/2004 | Feng et al. |
| 2005/0015488 A1 | 1/2005 | Bayyapu |
| 2005/0018177 A1 | 1/2005 | Rosenberg et al. |
| 2005/0021750 A1 | 1/2005 | Abrams |
| 2005/0027723 A1 | 2/2005 | Jones et al. |
| 2005/0029029 A1* | 2/2005 | Thorne ............... G05D 1/0242 180/167 |
| 2005/0034075 A1 | 2/2005 | Riegelman et al. |
| 2005/0044061 A1 | 2/2005 | Klemow |
| 2005/0049971 A1 | 3/2005 | Bettinger |
| 2005/0055353 A1 | 3/2005 | Marx et al. |
| 2005/0086309 A1 | 4/2005 | Galli et al. |
| 2005/0091027 A1 | 4/2005 | Zaher et al. |
| 2005/0091175 A9 | 4/2005 | Farmer |
| 2005/0091209 A1 | 4/2005 | Frank et al. |
| 2005/0094851 A1 | 5/2005 | Bodin et al. |
| 2005/0096977 A1 | 5/2005 | Rossides |
| 2005/0097319 A1 | 5/2005 | Zhu et al. |
| 2005/0108520 A1 | 5/2005 | Yamamoto et al. |
| 2005/0114527 A1 | 5/2005 | Hankey et al. |
| 2005/0114759 A1 | 5/2005 | Williams et al. |
| 2005/0114783 A1 | 5/2005 | Szeto |
| 2005/0120084 A1 | 6/2005 | Hu et al. |
| 2005/0131761 A1 | 6/2005 | Trika et al. |
| 2005/0137015 A1 | 6/2005 | Rogers et al. |
| 2005/0143174 A1 | 6/2005 | Goldman et al. |
| 2005/0144065 A1 | 6/2005 | Calabria et al. |
| 2005/0154639 A1 | 7/2005 | Zetmeir |
| 2005/0159970 A1 | 7/2005 | Buyukkokten et al. |
| 2005/0171799 A1 | 8/2005 | Hull et al. |
| 2005/0171832 A1 | 8/2005 | Hull et al. |
| 2005/0171954 A1 | 8/2005 | Hull et al. |
| 2005/0171955 A1 | 8/2005 | Hull et al. |
| 2005/0177385 A1 | 8/2005 | Hull et al. |
| 2005/0187823 A1 | 8/2005 | Howes |
| 2005/0192859 A1 | 9/2005 | Mertins et al. |
| 2005/0192912 A1 | 9/2005 | Bator et al. |
| 2005/0192999 A1 | 9/2005 | Cook et al. |
| 2005/0193410 A1 | 9/2005 | Eldering |
| 2005/0197775 A1 | 9/2005 | Smith |
| 2005/0197846 A1 | 9/2005 | Pezaris et al. |
| 2005/0197950 A1 | 9/2005 | Moya et al. |
| 2005/0198020 A1 | 9/2005 | Garland et al. |
| 2005/0198031 A1 | 9/2005 | Pezaris et al. |
| 2005/0198305 A1 | 9/2005 | Pezaris et al. |
| 2005/0203768 A1 | 9/2005 | Florance et al. |
| 2005/0203769 A1 | 9/2005 | Weild |
| 2005/0203807 A1 | 9/2005 | Bezos et al. |
| 2005/0209776 A1 | 9/2005 | Ogino et al. |
| 2005/0209781 A1 | 9/2005 | Anderson |
| 2005/0216120 A1* | 9/2005 | Rosenberg ............... G07F 9/02 700/244 |
| 2005/0216186 A1 | 9/2005 | Barnaby et al. |
| 2005/0216300 A1 | 9/2005 | Appelman et al. |
| 2005/0216550 A1 | 9/2005 | Paseman et al. |
| 2005/0219044 A1 | 10/2005 | Douglass et al. |
| 2005/0235062 A1 | 10/2005 | Lunt et al. |
| 2005/0238465 A1* | 10/2005 | Razumov ............... A47F 10/02 414/273 |
| 2005/0240580 A1 | 10/2005 | Zamir et al. |
| 2005/0251331 A1 | 11/2005 | Kreft |
| 2005/0256756 A1 | 11/2005 | Lam et al. |
| 2005/0259648 A1 | 11/2005 | Kodialam et al. |
| 2005/0270299 A1 | 12/2005 | Rasmussen et al. |
| 2005/0273346 A1 | 12/2005 | Frost |
| 2005/0283497 A1 | 12/2005 | Nurminen et al. |
| 2005/0288957 A1 | 12/2005 | Eraker et al. |
| 2005/0288958 A1 | 12/2005 | Eraker et al. |
| 2005/0289650 A1 | 12/2005 | Kalogridis |
| 2006/0004680 A1 | 1/2006 | Robarts et al. |
| 2006/0004703 A1 | 1/2006 | Spivack et al. |
| 2006/0004734 A1 | 1/2006 | Malkin et al. |
| 2006/0022048 A1 | 2/2006 | Johnson |
| 2006/0023881 A1 | 2/2006 | Akiyama et al. |
| 2006/0025883 A1 | 2/2006 | Reeves |
| 2006/0026147 A1 | 2/2006 | Cone et al. |
| 2006/0036588 A1 | 2/2006 | Frank et al. |
| 2006/0036748 A1 | 2/2006 | Nusbaum et al. |
| 2006/0041543 A1 | 2/2006 | Achlioptas |
| 2006/0042483 A1 | 3/2006 | Work et al. |
| 2006/0047825 A1 | 3/2006 | Steenstra et al. |
| 2006/0048059 A1 | 3/2006 | Etkin |
| 2006/0052091 A1 | 3/2006 | Onyon et al. |
| 2006/0058921 A1 | 3/2006 | Okamoto |
| 2006/0059023 A1 | 3/2006 | Mashinsky |
| 2006/0064431 A1 | 3/2006 | Kishore et al. |
| 2006/0074780 A1 | 4/2006 | Taylor et al. |
| 2006/0075335 A1 | 4/2006 | Gloor |
| 2006/0080613 A1 | 4/2006 | Savant |
| 2006/0085419 A1 | 4/2006 | Rosen |
| 2006/0088145 A1 | 4/2006 | Reed et al. |
| 2006/0089882 A1 | 4/2006 | Shimansky |
| 2006/0100892 A1 | 5/2006 | Ellanti |
| 2006/0113425 A1 | 6/2006 | Rader |
| 2006/0123053 A1 | 6/2006 | Scannell |
| 2006/0125616 A1 | 6/2006 | Song |
| 2006/0136127 A1 | 6/2006 | Coch et al. |
| 2006/0136419 A1 | 6/2006 | Brydon et al. |
| 2006/0143066 A1 | 6/2006 | Calabria |
| 2006/0143067 A1 | 6/2006 | Calabria |
| 2006/0143083 A1 | 6/2006 | Wedeen |
| 2006/0143183 A1 | 6/2006 | Goldberg et al. |
| 2006/0149624 A1 | 7/2006 | Baluja et al. |
| 2006/0161599 A1 | 7/2006 | Rosen |
| 2006/0178972 A1 | 8/2006 | Jung et al. |
| 2006/0184578 A1 | 8/2006 | La Rotonda et al. |
| 2006/0184617 A1 | 8/2006 | Nicholas et al. |
| 2006/0184997 A1 | 8/2006 | La Rotonda et al. |
| 2006/0190279 A1 | 8/2006 | Heflin |
| 2006/0190281 A1 | 8/2006 | Kott et al. |
| 2006/0194186 A1 | 8/2006 | Nanda |
| 2006/0200384 A1 | 9/2006 | Arutunian et al. |
| 2006/0212407 A1 | 9/2006 | Lyon |
| 2006/0217885 A1 | 9/2006 | Crady et al. |
| 2006/0218225 A1 | 9/2006 | Hee Voon et al. |
| 2006/0218226 A1 | 9/2006 | Johnson et al. |
| 2006/0223518 A1 | 10/2006 | Haney |
| 2006/0226281 A1 | 10/2006 | Walton |
| 2006/0229063 A1 | 10/2006 | Koch |
| 2006/0230061 A1 | 10/2006 | Sample et al. |
| 2006/0238383 A1 | 10/2006 | Kimchi et al. |
| 2006/0242139 A1 | 10/2006 | Butterfield et al. |
| 2006/0242178 A1 | 10/2006 | Butterfield et al. |

(56) References Cited

U.S. PATENT DOCUMENTS

| | | |
|---|---|---|
| 2006/0242581 A1 | 10/2006 | Manion et al. |
| 2006/0247940 A1 | 11/2006 | Zhu et al. |
| 2006/0248573 A1 | 11/2006 | Pannu et al. |
| 2006/0251292 A1 | 11/2006 | Gokturk et al. |
| 2006/0253491 A1 | 11/2006 | Gokturk et al. |
| 2006/0256008 A1 | 11/2006 | Rosenberg |
| 2006/0264209 A1 | 11/2006 | Atkinson et al. |
| 2006/0265277 A1 | 11/2006 | Yasinovsky et al. |
| 2006/0265417 A1 | 11/2006 | Amato et al. |
| 2006/0270419 A1 | 11/2006 | Crowley et al. |
| 2006/0270421 A1 | 11/2006 | Phillips et al. |
| 2006/0271287 A1 | 11/2006 | Gold et al. |
| 2006/0271472 A1 | 11/2006 | Cagan |
| 2006/0293976 A1 | 12/2006 | Nam |
| 2006/0294011 A1 | 12/2006 | Smith |
| 2007/0002057 A1 | 1/2007 | Danzig et al. |
| 2007/0003182 A1 | 1/2007 | Hunn |
| 2007/0005683 A1 | 1/2007 | Omidyar |
| 2007/0005750 A1 | 1/2007 | Lunt et al. |
| 2007/0011148 A1 | 1/2007 | Burkey et al. |
| 2007/0011617 A1 | 1/2007 | Akagawa et al. |
| 2007/0016689 A1 | 1/2007 | Birch |
| 2007/0027920 A1 | 2/2007 | Alvarado et al. |
| 2007/0032942 A1 | 2/2007 | Thota |
| 2007/0033064 A1 | 2/2007 | Abrahamsohn |
| 2007/0033182 A1 | 2/2007 | Knorr |
| 2007/0038646 A1 | 2/2007 | Thota |
| 2007/0043947 A1 | 2/2007 | Mizikovsky et al. |
| 2007/0050360 A1 | 3/2007 | Hull et al. |
| 2007/0061128 A1 | 3/2007 | Odom et al. |
| 2007/0061405 A1 | 3/2007 | Keohane et al. |
| 2007/0067219 A1 | 3/2007 | Altberg et al. |
| 2007/0078747 A1 | 4/2007 | Baack |
| 2007/0078772 A1 | 4/2007 | Dadd |
| 2007/0099609 A1 | 5/2007 | Cai |
| 2007/0105536 A1 | 5/2007 | Tingo |
| 2007/0106627 A1 | 5/2007 | Srivastava et al. |
| 2007/0112461 A1 | 5/2007 | Zini et al. |
| 2007/0112645 A1 | 5/2007 | Traynor et al. |
| 2007/0112729 A1 | 5/2007 | Wiseman et al. |
| 2007/0118430 A1 | 5/2007 | Wiseman et al. |
| 2007/0118525 A1 | 5/2007 | Svendsen |
| 2007/0150375 A1 | 6/2007 | Yang |
| 2007/0150603 A1 | 6/2007 | Crull et al. |
| 2007/0156429 A1 | 7/2007 | Godar |
| 2007/0159651 A1 | 7/2007 | Disario et al. |
| 2007/0162432 A1 | 7/2007 | Armstrong et al. |
| 2007/0162458 A1 | 7/2007 | Fasciano |
| 2007/0162547 A1 | 7/2007 | Ross |
| 2007/0162942 A1 | 7/2007 | Hamynen et al. |
| 2007/0167204 A1 | 7/2007 | Lyle et al. |
| 2007/0168852 A1 | 7/2007 | Erol et al. |
| 2007/0168888 A1 | 7/2007 | Jawerth |
| 2007/0174389 A1 | 7/2007 | Armstrong et al. |
| 2007/0179905 A1 | 8/2007 | Buch et al. |
| 2007/0182181 A1* | 8/2007 | Cohen .................. B60R 13/00 296/21 |
| 2007/0185906 A1 | 8/2007 | Humphries et al. |
| 2007/0192299 A1 | 8/2007 | Zuckerberg et al. |
| 2007/0203644 A1 | 8/2007 | Thota et al. |
| 2007/0203820 A1 | 8/2007 | Rashid |
| 2007/0207755 A1 | 9/2007 | Julia et al. |
| 2007/0208613 A1 | 9/2007 | Backer |
| 2007/0208802 A1 | 9/2007 | Barman et al. |
| 2007/0208916 A1 | 9/2007 | Tomita |
| 2007/0214141 A1 | 9/2007 | Sittig et al. |
| 2007/0218900 A1 | 9/2007 | Abhyanker |
| 2007/0219712 A1 | 9/2007 | Abhyanker |
| 2007/0226314 A1 | 9/2007 | Eick et al. |
| 2007/0233291 A1 | 10/2007 | Herde et al. |
| 2007/0233367 A1 | 10/2007 | Chen et al. |
| 2007/0233375 A1 | 10/2007 | Garg et al. |
| 2007/0239352 A1 | 10/2007 | Thota et al. |
| 2007/0239552 A1 | 10/2007 | Sundaresan |
| 2007/0239648 A1 | 10/2007 | Thota |
| 2007/0245002 A1 | 10/2007 | Nguyen et al. |
| 2007/0250321 A1 | 10/2007 | Balusu |
| 2007/0250511 A1 | 10/2007 | Endler et al. |
| 2007/0255785 A1 | 11/2007 | Hayashi et al. |
| 2007/0255831 A1 | 11/2007 | Hayashi et al. |
| 2007/0258642 A1 | 11/2007 | Thota |
| 2007/0259654 A1 | 11/2007 | Oijer |
| 2007/0260599 A1 | 11/2007 | McGuire et al. |
| 2007/0261071 A1 | 11/2007 | Lunt et al. |
| 2007/0266003 A1 | 11/2007 | Wong et al. |
| 2007/0266097 A1 | 11/2007 | Harik et al. |
| 2007/0266118 A1 | 11/2007 | Wilkins |
| 2007/0268310 A1 | 11/2007 | Dolph et al. |
| 2007/0270163 A1 | 11/2007 | Anupam et al. |
| 2007/0271367 A1 | 11/2007 | Yardeni et al. |
| 2007/0273558 A1 | 11/2007 | Smith et al. |
| 2007/0281689 A1 | 12/2007 | Altman et al. |
| 2007/0281690 A1 | 12/2007 | Altman et al. |
| 2007/0281716 A1 | 12/2007 | Altman et al. |
| 2007/0282621 A1 | 12/2007 | Altman et al. |
| 2007/0282987 A1 | 12/2007 | Fischer et al. |
| 2007/0288164 A1 | 12/2007 | Gordon et al. |
| 2007/0288311 A1 | 12/2007 | Underhill |
| 2007/0288621 A1 | 12/2007 | Gundu et al. |
| 2007/0294357 A1 | 12/2007 | Antoine |
| 2008/0005076 A1 | 1/2008 | Payne et al. |
| 2008/0005231 A1 | 1/2008 | Kelley et al. |
| 2008/0010343 A1 | 1/2008 | Escaffi et al. |
| 2008/0010365 A1 | 1/2008 | Schneider |
| 2008/0016051 A1 | 1/2008 | Schiller |
| 2008/0020814 A1 | 1/2008 | Kernene |
| 2008/0032666 A1 | 2/2008 | Hughes et al. |
| 2008/0032703 A1 | 2/2008 | Krumm et al. |
| 2008/0033641 A1 | 2/2008 | Medalia |
| 2008/0033652 A1 | 2/2008 | Hensley et al. |
| 2008/0033739 A1 | 2/2008 | Zuckerberg et al. |
| 2008/0033776 A1 | 2/2008 | Marchese |
| 2008/0040370 A1 | 2/2008 | Bosworth et al. |
| 2008/0040428 A1 | 2/2008 | Wei et al. |
| 2008/0040474 A1 | 2/2008 | Zuckerberg et al. |
| 2008/0040475 A1 | 2/2008 | Bosworth et al. |
| 2008/0040673 A1 | 2/2008 | Zuckerberg et al. |
| 2008/0043020 A1 | 2/2008 | Snow et al. |
| 2008/0043037 A1 | 2/2008 | Carroll |
| 2008/0046976 A1 | 2/2008 | Zuckerberg |
| 2008/0048065 A1 | 2/2008 | Kuntz |
| 2008/0051932 A1 | 2/2008 | Jermyn et al. |
| 2008/0059992 A1 | 3/2008 | Amidon et al. |
| 2008/0065321 A1 | 3/2008 | DaCosta |
| 2008/0065611 A1 | 3/2008 | Hepworth et al. |
| 2008/0070593 A1 | 3/2008 | Altman et al. |
| 2008/0070697 A1 | 3/2008 | Robinson et al. |
| 2008/0071929 A1 | 3/2008 | Motte et al. |
| 2008/0077464 A1 | 3/2008 | Gottlieb et al. |
| 2008/0077581 A1 | 3/2008 | Drayer et al. |
| 2008/0077642 A1 | 3/2008 | Carbone et al. |
| 2008/0077708 A1 | 3/2008 | Scott et al. |
| 2008/0086368 A1 | 4/2008 | Bauman et al. |
| 2008/0086458 A1 | 4/2008 | Robinson et al. |
| 2008/0091461 A1 | 4/2008 | Evans et al. |
| 2008/0091723 A1 | 4/2008 | Zuckerberg et al. |
| 2008/0091786 A1 | 4/2008 | Jhanji |
| 2008/0097999 A1 | 4/2008 | Horan |
| 2008/0098090 A1 | 4/2008 | Geraci et al. |
| 2008/0098313 A1 | 4/2008 | Pollack |
| 2008/0103959 A1 | 5/2008 | Carroll et al. |
| 2008/0104227 A1 | 5/2008 | Birnie et al. |
| 2008/0109718 A1 | 5/2008 | Narayanaswami |
| 2008/0115082 A1 | 5/2008 | Simmons et al. |
| 2008/0115226 A1 | 5/2008 | Welingkar et al. |
| 2008/0117928 A1 | 5/2008 | Abhyanker |
| 2008/0125969 A1 | 5/2008 | Chen et al. |
| 2008/0126355 A1 | 5/2008 | Rowley |
| 2008/0126411 A1 | 5/2008 | Zhuang et al. |
| 2008/0126476 A1 | 5/2008 | Nicholas et al. |
| 2008/0126478 A1 | 5/2008 | Ferguson et al. |
| 2008/0133495 A1 | 6/2008 | Fischer |
| 2008/0133649 A1 | 6/2008 | Pennington |
| 2008/0134035 A1 | 6/2008 | Pennington et al. |

(56) References Cited

U.S. PATENT DOCUMENTS

| | | |
|---|---|---|
| 2008/0148156 A1 | 6/2008 | Brewer et al. |
| 2008/0154733 A1 | 6/2008 | Wolfe |
| 2008/0155019 A1 | 6/2008 | Wallace et al. |
| 2008/0162027 A1 | 7/2008 | Murphy et al. |
| 2008/0162211 A1 | 7/2008 | Addington |
| 2008/0162260 A1 | 7/2008 | Rohan et al. |
| 2008/0167771 A1 | 7/2008 | Whittaker et al. |
| 2008/0168068 A1 | 7/2008 | Hutheesing |
| 2008/0168175 A1 | 7/2008 | Tran |
| 2008/0172173 A1 | 7/2008 | Chang et al. |
| 2008/0172244 A1 | 7/2008 | Coupal et al. |
| 2008/0172288 A1 | 7/2008 | Pilskalns et al. |
| 2008/0189292 A1 | 8/2008 | Stremel et al. |
| 2008/0189380 A1 | 8/2008 | Bosworth et al. |
| 2008/0189768 A1 | 8/2008 | Callahan et al. |
| 2008/0195483 A1 | 8/2008 | Moore |
| 2008/0208956 A1 | 8/2008 | Spiridellis et al. |
| 2008/0215994 A1 | 9/2008 | Harrison et al. |
| 2008/0221846 A1 | 9/2008 | Aggarwal et al. |
| 2008/0222140 A1 | 9/2008 | Lagad et al. |
| 2008/0229424 A1 | 9/2008 | Harris et al. |
| 2008/0231630 A1 | 9/2008 | Shenkar et al. |
| 2008/0238941 A1 | 10/2008 | Kinnan et al. |
| 2008/0243378 A1 | 10/2008 | Zavoli |
| 2008/0243667 A1 | 10/2008 | Lecomte |
| 2008/0243830 A1 | 10/2008 | Abhyanker |
| 2008/0255759 A1 | 10/2008 | Abhyanker |
| 2008/0256230 A1 | 10/2008 | Handley |
| 2008/0263460 A1 | 10/2008 | Altberg et al. |
| 2008/0269992 A1 | 10/2008 | Kawasaki |
| 2008/0270158 A1 | 10/2008 | Abhyanker |
| 2008/0270366 A1 | 10/2008 | Frank |
| 2008/0270615 A1 | 10/2008 | Centola et al. |
| 2008/0270945 A1 | 10/2008 | Abhyanker |
| 2008/0281854 A1 | 11/2008 | Abhyanker |
| 2008/0288277 A1 | 11/2008 | Fasciano |
| 2008/0288612 A1 | 11/2008 | Kwon |
| 2008/0294678 A1 | 11/2008 | Gorman et al. |
| 2008/0294747 A1 | 11/2008 | Abhyanker |
| 2008/0300979 A1 | 12/2008 | Abhyanker |
| 2008/0301565 A1 | 12/2008 | Abhyanker |
| 2008/0306754 A1 | 12/2008 | Abhyanker |
| 2008/0307053 A1 | 12/2008 | Mitnick et al. |
| 2008/0307066 A1 | 12/2008 | Amidon et al. |
| 2008/0307320 A1 | 12/2008 | Payne et al. |
| 2008/0316021 A1 | 12/2008 | Manz et al. |
| 2008/0319806 A1 | 12/2008 | Abhyanker |
| 2009/0003265 A1 | 1/2009 | Agarwal et al. |
| 2009/0006177 A1 | 1/2009 | Beaver et al. |
| 2009/0006473 A1 | 1/2009 | Elliott et al. |
| 2009/0007195 A1 | 1/2009 | Beyabani |
| 2009/0018925 A1* | 1/2009 | Abhyanker ............ G06Q 30/02 |
| | | 705/26.5 |
| 2009/0019004 A1 | 1/2009 | Abhyanker |
| 2009/0019085 A1 | 1/2009 | Abhyanker |
| 2009/0019122 A1 | 1/2009 | Abhyanker |
| 2009/0019366 A1 | 1/2009 | Abhyanker |
| 2009/0019373 A1 | 1/2009 | Abhyanker |
| 2009/0024740 A1* | 1/2009 | Abhyanker ....... G06F 17/30241 |
| | | 709/225 |
| 2009/0029672 A1 | 1/2009 | Manz |
| 2009/0030927 A1 | 1/2009 | Cases et al. |
| 2009/0031006 A1 | 1/2009 | Johnson |
| 2009/0031245 A1 | 1/2009 | Brezina et al. |
| 2009/0031301 A1 | 1/2009 | D'Angelo et al. |
| 2009/0043650 A1 | 2/2009 | Abhyanker et al. |
| 2009/0044254 A1 | 2/2009 | Tian |
| 2009/0048922 A1 | 2/2009 | Morgenstern et al. |
| 2009/0049018 A1 | 2/2009 | Gross |
| 2009/0049037 A1 | 2/2009 | Gross |
| 2009/0049070 A1 | 2/2009 | Steinberg |
| 2009/0049127 A1 | 2/2009 | Juan et al. |
| 2009/0061883 A1* | 3/2009 | Abhyanker ............ G06Q 30/02 |
| | | 455/445 |
| 2009/0063252 A1* | 3/2009 | Abhyanker ............ G06Q 30/02 |
| | | 705/7.32 |
| 2009/0063467 A1* | 3/2009 | Abhyanker ......... G06F 17/3087 |
| 2009/0063500 A1 | 3/2009 | Zhai et al. |
| 2009/0064011 A1* | 3/2009 | Abhyanker ............ G06Q 10/10 |
| | | 715/764 |
| 2009/0064144 A1* | 3/2009 | Abhyanker ....... G06F 17/30241 |
| | | 718/100 |
| 2009/0069034 A1* | 3/2009 | Abhyanker ............. H04W 4/02 |
| | | 455/456.3 |
| 2009/0070334 A1 | 3/2009 | Callahan et al. |
| 2009/0070435 A1 | 3/2009 | Abhyanker |
| 2009/0077100 A1 | 3/2009 | Hancock et al. |
| 2009/0102644 A1 | 4/2009 | Hayden |
| 2009/0119275 A1 | 5/2009 | Chen et al. |
| 2009/0132504 A1 | 5/2009 | Vegnaduzzo et al. |
| 2009/0132644 A1 | 5/2009 | Frishert et al. |
| 2009/0171950 A1 | 7/2009 | Lunenfeld |
| 2009/0177577 A1 | 7/2009 | Garcia |
| 2009/0177628 A1 | 7/2009 | Yanagisawa et al. |
| 2009/0228305 A1 | 9/2009 | Gustafsson et al. |
| 2009/0254971 A1 | 10/2009 | Herz et al. |
| 2009/0271417 A1 | 10/2009 | Toebes et al. |
| 2009/0271524 A1 | 10/2009 | Davi et al. |
| 2009/0284530 A1 | 11/2009 | Lester et al. |
| 2009/0287682 A1 | 11/2009 | Fujioka et al. |
| 2009/0299551 A1 | 12/2009 | So et al. |
| 2010/0011081 A1 | 1/2010 | Crowley et al. |
| 2010/0023388 A1 | 1/2010 | Blumberg et al. |
| 2010/0024045 A1 | 1/2010 | Sastry et al. |
| 2010/0051740 A1 | 3/2010 | Yoeli |
| 2010/0057555 A1 | 3/2010 | Butterfield et al. |
| 2010/0064007 A1 | 3/2010 | Randall |
| 2010/0070075 A1 | 3/2010 | Chirnomas |
| 2010/0076966 A1 | 3/2010 | Strutton et al. |
| 2010/0077316 A1 | 3/2010 | Omansky et al. |
| 2010/0079338 A1 | 4/2010 | Wooden et al. |
| 2010/0082683 A1 | 4/2010 | Law et al. |
| 2010/0083125 A1 | 4/2010 | Zafar et al. |
| 2010/0088015 A1 | 4/2010 | Lee |
| 2010/0094548 A1 | 4/2010 | Tadman et al. |
| 2010/0100937 A1 | 4/2010 | Tran |
| 2010/0106731 A1 | 4/2010 | Cartmell et al. |
| 2010/0108801 A1 | 5/2010 | Olm et al. |
| 2010/0118025 A1 | 5/2010 | Smith et al. |
| 2010/0120422 A1 | 5/2010 | Cheung et al. |
| 2010/0138259 A1 | 6/2010 | Delk |
| 2010/0138318 A1 | 6/2010 | Chun |
| 2010/0191798 A1 | 7/2010 | Seefeld et al. |
| 2010/0198684 A1 | 8/2010 | Eraker et al. |
| 2010/0214250 A1 | 8/2010 | Gillespie et al. |
| 2010/0231383 A1 | 9/2010 | Levine et al. |
| 2010/0243794 A1 | 9/2010 | Jermyn |
| 2010/0255899 A1 | 10/2010 | Paulsen |
| 2010/0275033 A1 | 10/2010 | Gillespie et al. |
| 2010/0306016 A1 | 12/2010 | Solaro et al. |
| 2011/0001020 A1 | 1/2011 | Forgac |
| 2011/0015954 A1 | 1/2011 | Ward |
| 2011/0022540 A1 | 1/2011 | Stern et al. |
| 2011/0040681 A1 | 2/2011 | Ahroon |
| 2011/0040692 A1 | 2/2011 | Ahroon |
| 2011/0041084 A1 | 2/2011 | Karam |
| 2011/0061018 A1 | 3/2011 | Piratla et al. |
| 2011/0066588 A1 | 3/2011 | Xie et al. |
| 2011/0066648 A1 | 3/2011 | Abhyanker et al. |
| 2011/0078012 A1 | 3/2011 | Adamec |
| 2011/0078270 A1 | 3/2011 | Galli et al. |
| 2011/0082747 A1 | 4/2011 | Khan et al. |
| 2011/0087667 A1 | 4/2011 | Hutheesing |
| 2011/0093340 A1 | 4/2011 | Kramer et al. |
| 2011/0093498 A1 | 4/2011 | Lunt et al. |
| 2011/0099142 A1 | 4/2011 | Karjalainen et al. |
| 2011/0106658 A1 | 5/2011 | Britt |
| 2011/0112976 A1 | 5/2011 | Ryan et al. |
| 2011/0128144 A1 | 6/2011 | Baron, Sr. et al. |
| 2011/0131172 A1 | 6/2011 | Herzog et al. |
| 2011/0151898 A1 | 6/2011 | Chandra et al. |
| 2011/0163160 A1* | 7/2011 | Zini ................. G05B 19/41895 |
| | | 235/385 |

(56) References Cited

U.S. PATENT DOCUMENTS

| | | |
|---|---|---|
| 2011/0174920 A1 | 7/2011 | Yoeli |
| 2011/0181470 A1 | 7/2011 | Qiu et al. |
| 2011/0202426 A1 | 8/2011 | Cretney et al. |
| 2011/0218839 A1* | 9/2011 | Shamaiengar ..... G06Q 30/0203 705/7.32 |
| 2011/0219318 A1 | 9/2011 | Abhyanker |
| 2011/0231268 A1 | 9/2011 | Ungos |
| 2011/0246258 A1 | 10/2011 | Cragun et al. |
| 2011/0256895 A1 | 10/2011 | Palin et al. |
| 2011/0258028 A1 | 10/2011 | Satyavolu et al. |
| 2011/0264692 A1 | 10/2011 | Kardell |
| 2011/0291851 A1 | 12/2011 | Whisenant |
| 2011/0313880 A1 | 12/2011 | Paul et al. |
| 2012/0023196 A1 | 1/2012 | Grayson et al. |
| 2012/0047102 A1 | 2/2012 | Petersen et al. |
| 2012/0047448 A1 | 2/2012 | Amidon et al. |
| 2012/0077523 A1 | 3/2012 | Roumeliotis et al. |
| 2012/0084289 A1 | 4/2012 | Hutheesing |
| 2012/0096098 A1 | 4/2012 | Balassanian |
| 2012/0123667 A1 | 5/2012 | Guéziec |
| 2012/0126974 A1 | 5/2012 | Phillips et al. |
| 2012/0138732 A1 | 6/2012 | Olm et al. |
| 2012/0166935 A1 | 6/2012 | Abhyanker |
| 2012/0191606 A1 | 7/2012 | Milne |
| 2012/0191797 A1 | 7/2012 | Masonis et al. |
| 2012/0209775 A1 | 8/2012 | Milne |
| 2012/0221470 A1 | 8/2012 | Lyon |
| 2012/0224076 A1 | 9/2012 | Niedermeyer et al. |
| 2012/0232958 A1 | 9/2012 | Silbert |
| 2012/0239224 A1* | 9/2012 | McCabe ................. B66F 9/063 701/2 |
| 2012/0239483 A1 | 9/2012 | Yankovich et al. |
| 2012/0239520 A1 | 9/2012 | Lee |
| 2012/0246024 A1 | 9/2012 | Thomas et al. |
| 2012/0254774 A1 | 10/2012 | Patton |
| 2012/0259688 A1 | 10/2012 | Kim |
| 2012/0264447 A1 | 10/2012 | Rieger, III |
| 2012/0270567 A1 | 10/2012 | Johnson |
| 2012/0278743 A1 | 11/2012 | Heckman et al. |
| 2012/0298688 A1* | 11/2012 | Stiernagle ............... G07F 9/023 221/155 |
| 2012/0331002 A1 | 12/2012 | Carrington |
| 2013/0024108 A1 | 1/2013 | Raimund Grün |
| 2013/0041761 A1 | 2/2013 | Voda |
| 2013/0041862 A1 | 2/2013 | Yang et al. |
| 2013/0054317 A1 | 2/2013 | Abhyanker |
| 2013/0055163 A1 | 2/2013 | Matas et al. |
| 2013/0068876 A1 | 3/2013 | Radu |
| 2013/0072114 A1 | 3/2013 | Abhyanker |
| 2013/0073375 A1 | 3/2013 | Abhyanker |
| 2013/0073474 A1 | 3/2013 | Young et al. |
| 2013/0103437 A1 | 4/2013 | Nelson |
| 2013/0105635 A1 | 5/2013 | Alzu'bi et al. |
| 2013/0110631 A1 | 5/2013 | Mitchell et al. |
| 2013/0151455 A1 | 6/2013 | Odom et al. |
| 2013/0159127 A1 | 6/2013 | Myslinski |
| 2013/0204437 A1 | 8/2013 | Koselka et al. |
| 2013/0234849 A1 | 9/2013 | Gupta et al. |
| 2013/0254670 A1 | 9/2013 | Eraker et al. |
| 2013/0282842 A1 | 10/2013 | Blecon et al. |
| 2013/0297589 A1 | 11/2013 | Work et al. |
| 2013/0301405 A1 | 11/2013 | Fuste Vilella et al. |
| 2013/0303197 A1 | 11/2013 | Chandra et al. |
| 2013/0317999 A1 | 11/2013 | Zimberoff et al. |
| 2013/0332021 A1* | 12/2013 | Goren .................... F41H 7/005 701/25 |
| 2014/0032034 A1 | 1/2014 | Raptopoulos et al. |
| 2014/0040179 A1 | 2/2014 | Herzog et al. |
| 2014/0067167 A1 | 3/2014 | Levien et al. |
| 2014/0067704 A1 | 3/2014 | Abhyanker |
| 2014/0074736 A1 | 3/2014 | Carrington |
| 2014/0081445 A1* | 3/2014 | Villamar ............... G06Q 10/08 700/216 |
| 2014/0081450 A1 | 3/2014 | Kuehnrich et al. |
| 2014/0095293 A1 | 4/2014 | Abhyanker |
| 2014/0108540 A1 | 4/2014 | Crawford |
| 2014/0108613 A1 | 4/2014 | Randall |
| 2014/0114866 A1 | 4/2014 | Abhyanker |
| 2014/0115671 A1 | 4/2014 | Abhyanker |
| 2014/0123246 A1 | 5/2014 | Abhyanker |
| 2014/0130140 A1 | 5/2014 | Abhyanker |
| 2014/0135039 A1 | 5/2014 | Sartipi et al. |
| 2014/0136328 A1 | 5/2014 | Abhyanker |
| 2014/0136414 A1* | 5/2014 | Abhyanker ............ G06Q 50/28 705/44 |
| 2014/0136624 A1 | 5/2014 | Abhyanker |
| 2014/0142848 A1 | 5/2014 | Chen et al. |
| 2014/0143061 A1 | 5/2014 | Abhyanker |
| 2014/0149244 A1* | 5/2014 | Abhyanker .......... G06Q 10/087 705/26.2 |
| 2014/0149508 A1 | 5/2014 | Middleton et al. |
| 2014/0164126 A1 | 6/2014 | Nicholas et al. |
| 2014/0165091 A1 | 6/2014 | Abhyanker |
| 2014/0172727 A1 | 6/2014 | Abhyanker et al. |
| 2014/0204360 A1 | 7/2014 | Dowski, Jr. et al. |
| 2014/0222908 A1* | 8/2014 | Park ....................... G06Q 10/10 709/204 |
| 2014/0232903 A1* | 8/2014 | Oshima ................ H04N 5/3532 348/229.1 |
| 2014/0254896 A1* | 9/2014 | Zhou ..................... B25J 9/0006 382/124 |
| 2014/0277834 A1 | 9/2014 | Levien et al. |
| 2014/0316243 A1 | 10/2014 | Niedermeyer |
| 2015/0006005 A1* | 1/2015 | Yu .......................... G06Q 10/08 701/22 |
| 2015/0202770 A1* | 7/2015 | Patron ................... G05D 1/024 700/245 |
| 2015/0274421 A1* | 10/2015 | Yamada ............... B65G 1/0492 700/218 |
| 2015/0317596 A1* | 11/2015 | Hejazi .................... G06Q 50/28 705/330 |
| 2017/0219676 A1* | 8/2017 | Tran ................. G01R 33/56509 |

FOREIGN PATENT DOCUMENTS

| | | |
|---|---|---|
| KR | 1020120121376 A | 7/2012 |
| WO | 2002019236 A1 | 3/2002 |
| WO | 2002041115 A2 | 5/2002 |
| WO | 2006020471 A1 | 2/2006 |
| WO | 2007113844 A1 | 10/2007 |
| WO | 2008105766 A1 | 9/2008 |
| WO | 2008108772 A1 | 9/2008 |
| WO | 2008118119 A1 | 10/2008 |
| WO | 2008111929 A3 | 11/2008 |
| WO | 2010103163 A1 | 9/2010 |
| WO | 2014121145 A1 | 8/2014 |

OTHER PUBLICATIONS

Benchmark-Backed Nextdoor Launches as a Private Social Network for Neighborhoods, Techcrunch Article, Oct. 26, 2011 by Leena Rao (6 Pages) http://techcrunch.com/2011/10/26/benchmark-backed-nextdoor-launches-as-a-private-social-network-for-neighborhoods/.

Fatdoor Founder Sues Benchmark Capital, Saying it Stole His Idea for Nextdoor, All Things Digital Article, Nov. 11, 2011, by Liz Gannes (7 Pages) http://allthingsd.com/20111111/fatdoor-founder-sues-benchmark-capital-saying-it-stole-his-idea-for-nextdoor/.

Fatdoor CEO Talks About Balancing Security with Community, Wired Magazine, May 31, 2007, by Terrence Russell (2 Pages) http://www.wired.com/2007/05/fatdoor_ceo_tal/.

Fatdoor Launches Social Network for Your Neighborhood, Mashable Article, May 28, 2007, by Kristen Nicole (3 Pages) http://mashable.com/2007/05/28/fatdoor/.

Screenshots of Nextdoor website and its features—as submitted in Case5:14-cv-02335-BLF on Jul. 15, 2014 (pp. 19) http://www.nextdoor.com/.

Fatdoor turns neighborhoods into online social networks, VentureBeat News Article, May 28, 2007, by Dan Kaplan (pp. 4)

(56) References Cited

OTHER PUBLICATIONS http://venturebeat.com/2007/05/28/fatdoor-turns-neighborhoods-into-online-social-networks/.
Halloween Just Got Easier: Nextdoor Debuts Halloween Treat Map, Nextdoor Blog, Oct. 17, 2013, by Anne Dreshfield (pp. 6) http://blog.nextdoor.com/2013/10/17/halloween-just-got-easier-nextdoor-debuts-halloween-treat-map/.
Helping Neighbors Connect, Screenshot from FrontPorchForum website—screenshots of Aug. 21, 2014 (3 Pages) http://frontporchforum.com/.
Advocacy Strategy for the Age of Connectivity, Netcentric Advocacy: fatdoor.com (alpha), Jun. 23, 2007 (p. 1) http://www.network-centricadvocacy.net/2007/06/fatdoorcom-alph.html.
Silicon Valley venture capital and legal globalization Blog, WayBack Machine Blogs Apr. 8, 2008, by Raj V. Abhyanker (pp. 2) https://web.archive.org/web/20080706001509/http:/abhyanker.blogspot.com/.
Frontporchforum. screenshots. Jul. 19, 2006 webarchive.org 1-15 (herein FrontPorch) (pp. 15).
Fatdoor where 2.0 Launch Coverage Report, Jun. 21, 2007, by Sterling Communications (pp. 24).
Screenshot of Fatdoor on Wikipedia, Apr. 12, 2007 (p. 1).
Case No. 5-14-cv-02335-BLF Complaint *Fatdoor.* v. *Nextdoor*, Northern District of California, with Exhibits A, B and C {Part 1 (pp. 258)} and Exhibits D, E, F, G and H {Part 2 (pp. 222)}, Jul. 15, 2014.
Expert Report—Forensics of Jon Berryhill, Report, *Nextdoor* v. *Abhyanker*, Aug. 8, 2014, by Berryhill Computer forensics Inc. (pp. 23).
Case No. 3:12-cv-05667-EMC Complaint *Nextdoor* v. *Abhyanker*, Northern District of California, Nov. 5, 2012 (pp. 46).
Expert Report—Patent of Jeffrey G. Sheldon, *Nextdoor* v. *Abhyanker*, Aug. 8, 2014 (pp. 7).
Exhibits of Expert Report—Patent of Jeffrey G. Sheldon, *Nextdoor* v. *Abhyanker*, with Attachments A, B, C, D and E (12) {Part 1 (pp. 46)} and Attachments E (2/2) and F {Part 2 (pp. 41)}.
Case No. 111-CV-212924 *Abhyanker* v. *Benchmark Capital Partners L.P.*, Superior Court of California, County of Santa Clara, Nov. 10, 2011 (pp. 78) http://www.scribd.com/doc/72441873/Stamped-COMPLAINT-Abhyanker-v-Benchmark-Capital-Et-Al-FILED-PUBLIC.
Neighbors Stop Diaper and Formula Thief in his Tracks, Nextdoor Blog, Aug. 15, 2014, by Anne Dreshfield (pp. 12) http://blog.nextdoor.com/.
Screenshot of Fatdoor website with its features—Aug. 21, 2014 (pp. 6) http://www.fatdoor.com/.
Screenshot of AirBnB website with its features—Aug. 21, 2014 (pp. 4) http://www.airbnb.com/.
Wikipedia entry AirBnB website—Aug. 21, 2014 (pp. 16) http://en.wikipedia.org/wiki/Airbnb.
AirBed&Breakfast for Connecting '07—Oct. 10, 2007 (1 Page) http://www.core77.com/blog/events/airbed_breakfast_for_connecting_07_7715.asp.
Case No. 5:14-cv-03844-PSG, Complaint *Fatdoor, Inc.* v. *IP Analytics LLC and Google Inc.*,Northern District of California, Aug. 25, 2014, (pp. 16).
Screenshot of Meetey on CrunchBase, Aug. 27, 2014, (pp. 3) http://www.crunchbase.com/organization/meetey.
Wikipedia entry Patch Media website—Aug. 27, 2014 (pp. 2) http://en.wikipedia.org/wiki/Patch_Media.
Wikipedia entry Yahoo! Groups website—Aug. 27, 2014 (pp. 7) http://en.wikipedia.org/wiki/Yahoo_groups.
Palo Alto News on Topix, Aug. 27, 2014, (pp. 3) http://www.topix.com/palo-alto.
Screenshot of My Neighbourhoods on CrunchBase, Aug. 27, 2014 (pp. 2) http://www.crunchbase.com/organization/my-neighbourhoods.
Screenshot of Dehood website, Aug. 27, 2014, (p. 1) http://www.dehood.com/home.
Wikipedia entry The Freecycle Network website—Aug. 27, 2014 (pp. 3) http://en.wikipedia.org/wiki/The_Freecycle_Network.
eDirectree Brings Group Wiki Twist to Social Networking, Techcrunch Article, Feb. 1, 2008 by Mark Hendrickson, (pp. 2) http://techcrunch.com/2008/02/01/edirectree-brings-group-wiki-twist-to-social-networking/.
Wikipedia entry Meetup website—Aug. 27, 2014 (p. 1) http://en.wikipedia.org/wiki/Meetup_(website).
Wikipedia entry Google Maps website—Aug. 27, 2014 (p. 18) http://en.wikipedia.org/wiki/Google_Maps.
Screenshot of Facebook website for groups, Aug. 27, 2014, (p. 1) https://www.facebook.com/about/groups.
Facebook Engineers bring Google+ Circles to Facebook, Article on ZDNet by Emil Protalinski, Jul. 3, 2011, (pp. 2) http://www.zdnet.com/blog/facebook/facebook-engineers-bring-google-circles-to-facebook/1885.
Screenshot of Uber website, Aug. 27, 2014, (pp. 5) https://www.uber.com/.
Screenshot of Lyft website, Aug. 27, 2014, (pp. 5) https://www.lyft.com/.
Wikipedia entry Google driverless car—Aug. 27, 2014 (pp. 4) http://en.wikipedia.org/wiki/Google_driverless_car.
Wikipedia entry Uber (company)—Aug. 27, 2014 (pp. 7) http://en.wikipedia.org/wiki/Uber_(company).
Wikipedia entry Autonomous car—Aug. 27, 2014 (pp. 15) http://en.wikipedia.org/wiki/Autonomous_car.
Screenshot of sidecar website, Aug. 27, 2014 (p. 1) http://www.sidecar.com/.
Screenshot of patch media website, Aug. 27, 2014 (pp. 6) http://patch.com/.
Screenshot of i-neighbors website, Aug. 27, 2014 (pp. 3) https://www.i-neighbors.org/howitworks.php.
"Friends and Neighbors on the Web", 2001 by Lada A. Adamic et al. (pp. 9) http://www.hpl.hp.com/research/idl/papers/web10/fnn2.pdf.
"A social influence model of consumer participation in network-and small-group-based virtual communities", International Journal of Research in Marketing, 2004 by Utpal M, Dholakia et al. (pp. 23) http://www-bcf.usc.edu/~douglast/620/bettina1.pdf.
"BuzzMaps: a prototype social proxy for predictive utility", ACM Digital Library, 2003 by Azzari Caillier Jarrett et al. (Pages) http://dl.acm.org/citation.cfm?id=948547&dl=ACM&coll=DL&CFID=456946313&CFTOKEN=50139062.
"Direct Annotation: A Drag-and-Drop Strategy for Labeling Photos", University of Maryland, 2000 by Ben Shneiderman et al. (pp. 8) http://hcil2.cs.umd.edu/trs/2000-06/2000-06.pdf.
"Notification for Shared Annotation of Digital Documents", Technical Report MSR-TR-2001-87, Sep. 19, 2001 by A. J. Bernheim Brush et al. (pp. 9) http://research.microsoft.com/pubs/69880/tr-2001-87.pdf.
"HT06, Tagging Paper, Taxonomy, Flickr, Academic Article, ToRead", Yahoo Research Berkeley, CA, 2006 by Cameron Marlow et al. (pp. 9) http://www.danah.org/papers/Hypertext2006.pdf.
"Computer Systems and the Design of Organizational Interaction", by Fernando Flores et al. (pp. 20) http://cpe.njit.edu/dlnotes/CIS/CIS735/ComputerSystemsandDesign.pdf.
"ChipIn—the easy way to collect money", Louis' Really Useful Finds, Mar. 12. (p. 1) http://reallyusefulthings.tumblr.com/post/28688782/chipin-the-easy-way-to-collect-money.

\* cited by examiner

| OCCUPIER 110 | HOME 114 | REQUEST 116 | BOARDING LOCATION 128 | UNIQUE IDENTIFIER 122 | SERIAL NUMBER OF THE AUTONOMOUS PLATFORM 302 | STATUS OF THE SHOPPING CART 304 |
|---|---|---|---|---|---|---|
| BOB JONES | 1500 OAK STREET, MOUNTAIN VIEW | GLOSSARY ITEM 4 | HOME: X1,Y1 WORK: X2,Y2 | CART NO. 8339 | 128496 | AT BOARDING LOCATION |
| JENNA DOE | 1125 8TH STREET, MOUNTAIN VIEW | GLOSSARY ITEM 9 | HOME: X3,Y3 WORK: X4,Y4 | CART NO. 8274 | 821672 | AWAY FROM BOARDING LOCATION |
| | | | | | | |

TABLE VIEW 350

FIGURE 3

TRAIN BASED COMMUNITY

FIELD OF TECHNOLOGY

This disclosure relates generally to the technical fields of communications and, in one example embodiment, to a method, apparatus, and system of a train based community.

BACKGROUND

Residents of a residential community may have a number of errands that they must complete on a given day. These errands may force residents to spend time and/or traveling moving to and/or from merchants and/or transporting goods (e.g., groceries, clothing, and/or household products). As a result, roads may be congested by vehicles transporting goods and/or time may be wasted as residents travel to and/or from merchant locations in order to transport items to and/or from their home and/or work.

SUMMARY

A method, device and system of a train based community are disclosed. In one aspect, a method includes forming a train track adjacent to a set of homes in a residential community, placing a boarding location in a property boundary of each one of the set of homes in the residential community, and routing the train track to a merchant in the residential community. A shopping cart is autonomously routed from at least one boarding location of the property boundary to the merchant based on a request of an occupier of a home associated with the property boundary.

It may be determine that the shopping cart is placed on an autonomous platform associated with the occupier of the home associated with the property boundary. The shopping cart may be autonomously routed to the merchant when the shopping cart is placed on the autonomous platform. It may be determined that the autonomous platform with the shopping cart is sharing the train track with other autonomous platforms each with shopping carts of other occupiers of other homes in the residential community.

The autonomous platform and/or the shopping cart may be permitted to communicate with at least one of neighboring autonomous platforms and neighboring shopping carts through a centralized server (through a wide area network) and/or a local area network formed between adjacent ones of the autonomous platform and/or the shopping cart and/or neighboring autonomous platforms and/or neighboring shopping carts. The centralized server may include an electronic commerce algorithm through which each occupier of each home of the residential community place an order to purchase an item of the merchant through a neighborhood social network. The autonomous platforms associated with each occupier may be communicatively directed to the merchant and/or other neighbors of the residential community when the shopping cart is placed on the autonomous platform associated with each occupant based on a request of a particular occupier in control of a particular autonomous platform.

A message may be automatically communicated to the merchant when the particular occupier places the order to purchase the item of the merchant. The message may include a description of the item, a location of the item, an identification of the particular occupier, a serial number of the particular autonomous platform, and/or a unique identifier of a particular shopping cart associated with the particular autonomous platform. The shopping cart may arrive in an interior space of a particular home associated with the particular occupier through a gate through which the particular autonomous platform associated with the particular shopping cart is transportable. The boarding location may be located in the interior space of the home.

The particular autonomous platform and/or the particular shopping cart includes a light assembly such that the at least one of the particular autonomous platform and the particular shopping cart automatically provides lighting in when an ambient lighting level dips below a threshold value. A building of the merchant may include a product picker in a warehouse area of the merchant at which the item is loaded when the message is received. The particular autonomous platform and/or the particular shopping cart may detect an obstacle when on a route between the particular home and the merchant. The obstacle may be a street, a pedestrian, and/or an object on the train track impeding progress of the particular autonomous platform and/or the particular shopping cart.

Multiple different types of assemblies (e.g., a box assembly, a carrier assembly, a locker assembly, and/or a person transporter rover assembly) may be attachable to the particular autonomous platform. The shopping cart may be personal to the occupier. The residential community may be a master planned community.

In another aspect, a method includes forming a train track adjacent to a set of homes in a residential community, placing a boarding location in a property boundary of each one of the set of homes in the residential community, routing the train track to a merchant in the residential community, and determining that a shopping cart is placed on an autonomous platform associated with an occupier of a home associated with the property boundary. The shopping cart may be autonomously routed to the merchant when the shopping cart is placed on the autonomous platform.

The shopping cart may be autonomously routed from at least one boarding location of the property boundary to the merchant based on a request of the occupier of the home associated with the property boundary. It may be determined that the autonomous platform with the shopping cart is sharing the train track with other autonomous platforms each with shopping carts of other occupiers of other homes in the residential community. The autonomous platform and/or the shopping cart may be permitted to communicate with at least one of neighboring autonomous platforms and neighboring shopping carts through a centralized server (through a wide area network) and/or a local area network formed between adjacent ones of the autonomous platform and/or the shopping cart and neighboring autonomous platforms and/or neighboring shopping carts.

The centralized server may include an electronic commerce algorithm through which each occupier of each home of the residential community to place an order to purchase an item of the merchant through a neighborhood social network. The autonomous platforms associated with each occupier are communicatively directed to at least one of the merchant and other neighbors of the residential community when the shopping cart is placed on the autonomous platform associated with each occupant based on a request of a particular occupier in control of a particular autonomous platform. A message may be automatically communicated to the merchant when the particular occupier places the order to purchase the item of the merchant.

The message may include a description of the item, a location of the item, an identification of the particular occupier, a serial number of the particular boarding location, and/or a unique identifier of a particular shopping cart associated with the particular autonomous platform. The shopping cart may arrive in an interior space of a particular home associated with the particular occupier through a gate through which the particular autonomous platform associated with the particular shopping cart is transportable. The boarding location may be located in the interior space of the home.

The particular autonomous platform and/or the particular shopping cart may include a light assembly such that the particular autonomous platform and/or the particular shopping cart automatically provides lighting in when an ambient lighting level dips below a threshold value. A building of the merchant may include a product picker in a warehouse area of the merchant at which the item is loaded when the message is received. The particular autonomous platform and/or the particular shopping cart may detect an obstacle when on a route between the particular home and the merchant.

The obstacle may be a street, a pedestrian, and/or an object on the train track impeding progress of the particular autonomous platform and/or the particular shopping cart. Multiple different types of assemblies may be attachable to the particular autonomous platform. The multiple assemblies may include a box assembly, a carrier assembly, a locker assembly, and/or a person transporter rover assembly. The shopping cart may be personal to the occupier he residential community may be a master planned community.

In yet another aspect, a residential community includes a train track formed adjacent to a set of homes in a residential community and routed to a merchant in the residential community. A boarding location is placed in a property boundary of each one of the set of homes in the residential community. The residential community also includes a shopping cart to autonomously route from at least one boarding location of the property boundary to the merchant based on a request of an occupier of a home associated with the property boundary.

A placement algorithm may determine that the shopping cart is placed on an autonomous platform associated with the occupier of the home associated with the property boundary. A routing algorithm may autonomously route the shopping cart to the merchant when the shopping cart is placed on the autonomous platform. A sharing algorithm may determine that the autonomous platform with the shopping cart is sharing the train track with other autonomous platforms each with shopping carts of other occupiers of other homes in the residential community.

A communication algorithm may permit the autonomous platform and/or the shopping cart to communicate with neighboring autonomous platforms and/or neighboring shopping carts through a centralized server (through a wide area network) and/or a local area network formed between adjacent ones of the autonomous platform and/or the shopping cart and neighboring autonomous platforms and/or neighboring shopping carts. An electronic commerce algorithm may enable each occupier of each home of the residential community to place an order to purchase an item of the merchant through a neighborhood social network. A direction algorithm to communicatively direct the shopping cart associated with each occupier to at least one of the merchant and other neighbors of the residential community when the shopping cart is placed on the boarding location associated with each occupant based on a request of a particular occupier in control of a particular autonomous platform.

A message algorithm may automatically communicate a message to the merchant when the particular occupier places the order to purchase the item of the merchant. The message may include a description of the item, a location of the item, an identification of the particular occupier, a serial number of the particular autonomous platform, and/or a unique identifier of a particular shopping cart associated with the particular autonomous platform. The shopping cart may arrive in an interior space of a particular home associated with the particular occupier through a gate through which the particular autonomous platform associated with the particular shopping cart is transportable. The boarding location may be located in the interior space of the home.

The particular autonomous platform and/or the particular shopping cart may include a light assembly such that the particular autonomous platform and/or the particular shopping cart automatically provides lighting in when an ambient lighting level dips below a threshold value. A building of the merchant may include a product picker in a warehouse area of the merchant at which the item is loaded when the message is received.

The particular autonomous platform and/or the particular shopping cart may detect an obstacle when on a route between the particular home and the merchant. The obstacle may be a street, a pedestrian, and/or an object on the train track impeding progress of the particular autonomous platform and/or the particular shopping cart. Multiple different types of assemblies (e.g., a box assembly, a carrier assembly, a locker assembly, and/or a person transporter rover assembly) may be attachable to the particular autonomous platform. The shopping cart may be personal to the occupier. The residential community may be a master planned community.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 3 is a table view illustrating data relationships between the occupier, the request, and the shopping cart, according to one embodiment.

Other features of the present embodiments will be apparent from the accompanying drawings and from the detailed description that follows.

DETAILED DESCRIPTION

Disclosed are a method and system of a mapping search engine offering sidewalk maps, according to one embodiment.

Figure 1:
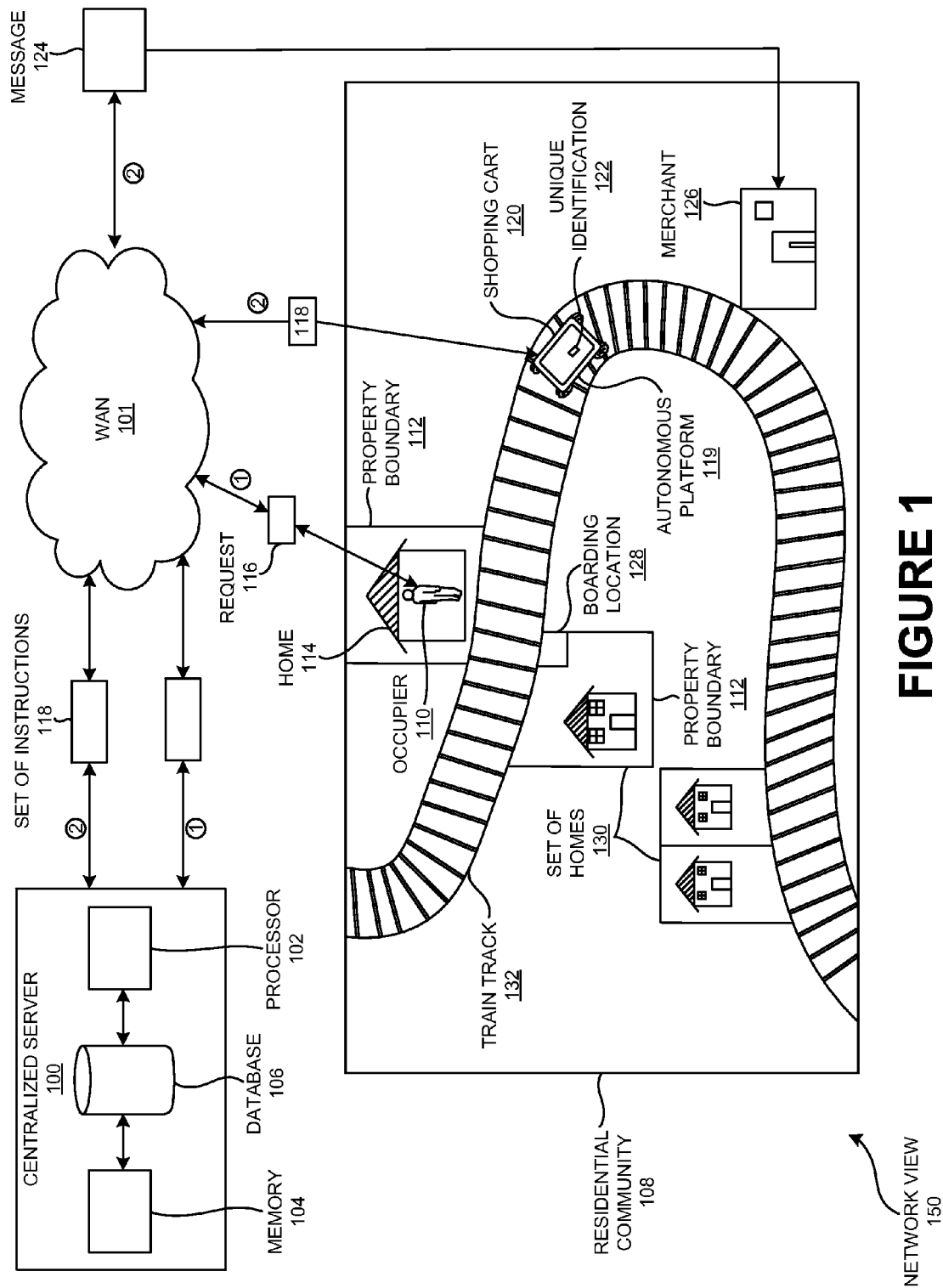
FIG. 1 is a network view showing a centralized server routing a shopping cart to a merchant in a residential community based on a request of an occupier of a home in the residential community, according to one embodiment.

FIG. 1 is a network view 150 showing a centralized server routing a shopping cart to a merchant in a residential community based on a request of an occupier of a home in the residential community, according to one embodiment. In particular, FIG. 1 shows a centralized server 100, a network 101, a processor 102, a memory 104, a database 106, a residential community 108, an occupier 110, a property boundary 112, a home 114, a request 116, a set of instructions 118, an autonomous platform 119, a shopping cart 120, a unique identifier 122, a message 124, a merchant 126, a boarding location 128, a set of homes 130, and a train track 132.

The residential community 108 may be a master planned community designed around the train track 132. In one embodiment, the set of homes 130 (e.g., residential houses and/or apartments), schools, buildings 702 (e.g., government buildings, hotels, and/or public buildings), parks, emergency services (e.g., police stations, hospitals, and/or fire departments) and/or merchants 126 (e.g., commercial entities, stores, and/or shops) in the residential community 108 may be built, located, and/or designed to be accessible by the train track 132. The train track 132 may be designed in such a way that any number of the set of homes 130, buildings 702, parks, emergency services, and/or merchants 126 are accessible by the train track 132.

In one embodiment, every occupier 110 (e.g., person that lives and/or works in the residential community 108) and/or non-transitory location (e.g., home 114, building 702, park, emergency service, and/or merchant 126) may have an associated (e.g., uniquely associated) autonomous platform 119, shopping cart 120 and/or boarding location 128. The boarding location 128 may be in the property boundary 112 associated with the non-transitory location (e.g., the home 114 associated with the occupier 110 and/or a building 702 associated with the merchant 126). In one embodiment, the property boundary 112 may be determined by the user and/or occupiers 110 of the residential community 108. The property boundary 112 may be determined entirely or in part by a data provider (e.g., Zillow.com, a white pages service, a government entity, official records, a deed, and/or a lease) and/or a vote (e.g., a vote by occupiers 110 and/or merchants 126 in the residential community 108). The property boundary 112 may be the legal boundary of the property (e.g., the home 114 and/or the building 702 associated with the merchant 126).

In one embodiment, each of the shopping carts 120 may be coupled with the train track 132 such that the shopping cart 120 is permanently affixed with the track and/or the boarding location 128. The shopping cart 120 may be coupled with the autonomous platform 119 which may be coupled with the train track 132. The shopping cart 120 and/or the autonomous platform 119 may be capable of being removed from the train track 132. In one embodiment, the boarding location 128 may be on the train track 132 and/or a section of the train track. The boarding location 128 may be separate from the train track 132 and/or positioned so that the shopping cart 120 may autonomously reach the boarding location 128 from the train track 132.

Each of the shopping carts 120, autonomous platforms 119, and/or boarding locations 128 may be communicatively coupled with the centralized server 100 through the network 101. The centralized server 100 may include the processor 102, the memory 104, and/or the database 106. The centralized server 100 may be one or more server side data processing system (e.g., web servers operating in concert with each other) that operate in a manner that provide a set of instructions 118 to any number of client side devices (e.g., a mobile device and/or a computing device) communicatively coupled with the centralized server 100 through the network 101. For example, the centralized server 100 may be a computing system (e.g., or a group of computing systems) that operates in a larger client-server database framework (e.g., such as in a social networking software such as Nextdoor.com, Fatdoor.com, Facebook.com, etc.).

FIG. 1 illustrates a number of operations between the centralized server 100, the occupier 110, shopping cart 120, and the merchant 126. Particularly, circle '1' of FIG. 1 illustrates the request 116 being communicated from the occupier 110 of the home 114 in the residential community 108, through the network 101 (e.g., an Internet protocol network and/or a wide area network), to the centralized server 100. The request 116 may be an order 402 and/or a set of instructions 118 communicated by a data processing system 400 of the occupier 110. The data processing system 400 (e.g., a smartphone, a tablet, a laptop, a desktop computer, and/or a mobile device) may communicate the request 116 through a network (e.g., the network 101 and/or a cellular network) using a browser application of the data processing system 400 (e.g., Google®, Chrome) and/or through a client-side application downloaded to the data processing system 400 (e.g., a Nextdoor.com mobile application, a Fatdoor.com mobile application). The occupier 110 may be able to communicate the request 116 from any location. The request 116 may be sent from the data processing system 400 associated with the occupier 110, through the network 101, to the centralized server 100.

Circle '2' shows the set of instructions 118 being communicated by the centralized server 100 to the autonomous platform 119 having the shopping cart 120 placed on it. The set of instructions 118 may be generated, using the processor 102 and the memory 104, based on the request 116 communicated by the occupier 110. The set of instructions 118 may route the autonomous platform 119 and/or the shopping cart 120 along the train track 132 to at least one destination (e.g., the boarding location 128 associated with the merchant 126). The set of instructions 118 may calibrate an assembly (e.g., a box assembly, a carrier assembly 606, a locker assembly, the shopping cart 120, and/or a person transporter rover assembly) placed on the autonomous platform 119. In one embodiment, the set of instructions 118 may set an interior of the assembly to a particular temperature and/or humidity, may calibrate a weight sensor (e.g., to determine the weight of contents placed in the assembly), and/or may set preferences of the shopping cart 120, the autonomous platform 119, and/or boarding location 128 (e.g., a lock combination and/or unlocking means, speed and/or threshold ambient lighting level). The set of instructions 118 may be communicated to the autonomous platform 119. In one embodiment, the autonomous platform 119 may route the shopping cart 120 to the destination (e.g., the boarding location 128 associated with the merchant 126).

The occupier 110 may receive a confirmation message 124 on the data processing system 400 used to communicate the request 116. The centralized server 100 may simultaneously communicate a message 124 through the network 101 to the merchant 126. The message 124 may include an order 402, an estimated time of arrival of the shopping cart 120, a message 124 from the occupier 110, and/or a set of instructions 118.

Figure 2:
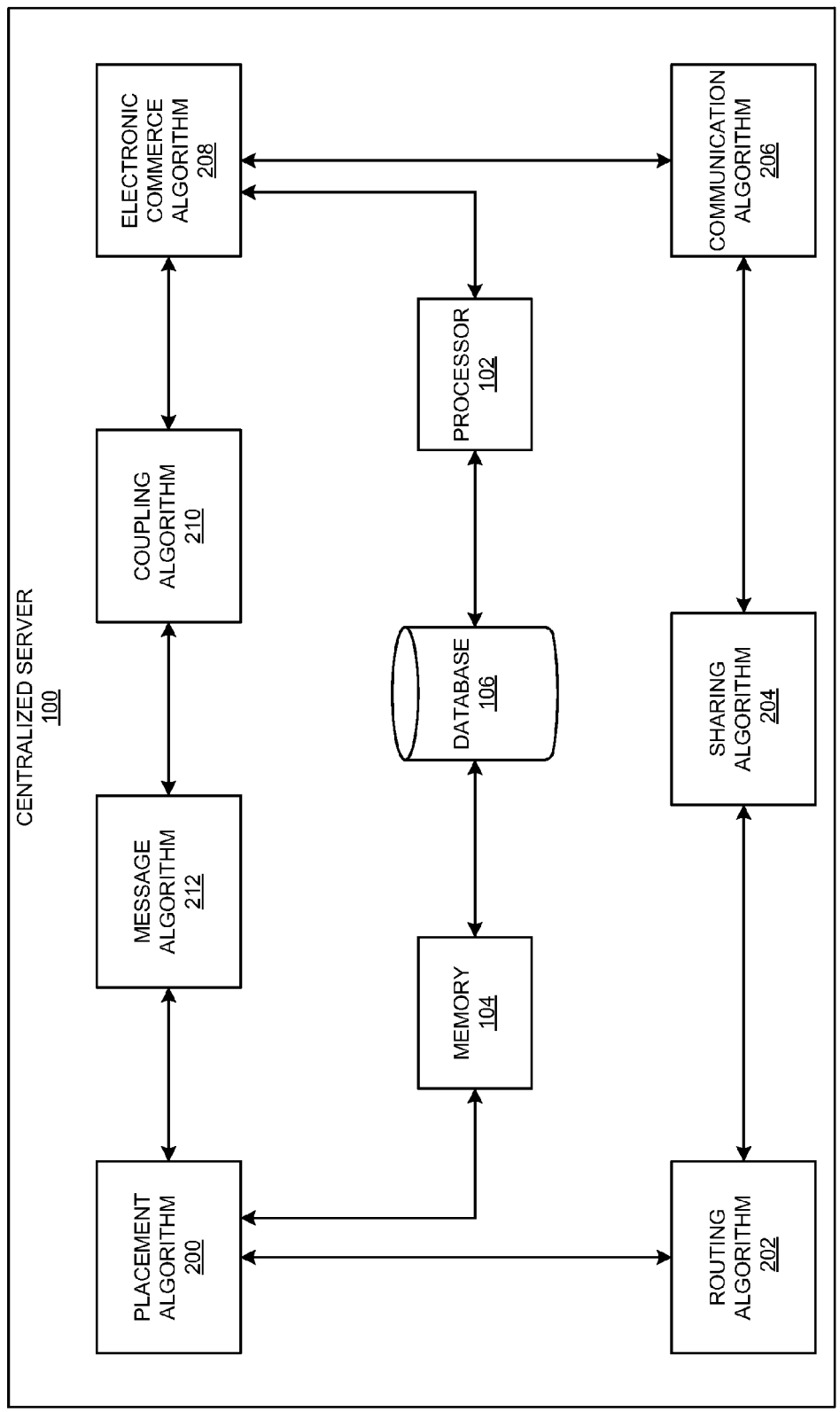
FIG. 2 is an exploded view of the centralized server of FIG. 1, according to one embodiment.

FIG. 2 is an exploded view 250 of the centralized server 100 of FIG. 1, according to one embodiment. FIG. 2 shows a placement algorithm 200, a routing algorithm 202, a sharing algorithm 204, a communication algorithm 206, an electronic commerce algorithm 208, a coupling algorithm 210, and a message algorithm 212.

The placement algorithm 200 may determine that the shopping cart 120 (e.g., the assembly) is placed on the autonomous platform 119 associated with the occupier 110 of the home 114 associated with the property boundary 112. The placement algorithm 200 may use a sensor (e.g., a weight sensor) on the autonomous platform 119 and/or the shopping cart 120 and/or the geo-spatial location of the shopping cart 120 to determine if the shopping cart 120 is located on the autonomous platform 119. The placement algorithm 200 may determine which autonomous platform 119 the shopping cart 120 is placed on.

The routing algorithm 202 may autonomously route 506 the shopping cart 120 to the merchant 126 when the shopping cart 120 is placed on the autonomous platform 119. The routing algorithm 202 may route the shopping cart 120 upon receipt of the request 116 and/or generation of the set of instructions 118. In one embodiment, the routing algorithm 202 may generate and/or aid in generating the set of instructions 118 which route 506 the shopping cart 120 to the boarding location 128 of the merchant 126. The autonomous platform 119 may automatically route 506 the shopping cart 120 upon receipt of the set of instructions 118 and/or may route the shopping cart 120 in accordance with the set of instructions 118.

The sharing algorithm 204 may determine that the autonomous platform 119 with the shopping cart 120 is sharing the train track 132 with other autonomous platform 119 each with shopping carts 120 of other occupiers 110 of other homes 114 in the residential community 108. The communication algorithm 206 may permit the autonomous platform 119 and/or the shopping cart 120 to communicate with neighboring boarding locations 128 and/or neighboring shopping carts 120 through the centralized server 100 (e.g., through a wide area network (e.g., the network 101)) and/or a local area network. The local area network may be formed between adjacent ones of the autonomous platform 119 and/or the shopping cart 120 and/or neighboring autonomous platform 119 and/or neighboring shopping carts 120. In one embodiment, shopping carts 120 may not be unique to occupiers 110 and/or may work in concert to maximize efficiency of route 506s and/or tasks. The communication algorithm 206 may enable shopping carts 120 and/or autonomous platforms 119 to communicate to determine optimal routes and/or enable a particular shopping cart 120 to complete a set of requests for different occupiers (e.g., in the scenario in which it is most efficient for the particular shopping cart 120 to complete the set of requests).

The electronic commerce algorithm 208 may enable each occupier 110 of each home 114 of the residential community 108 to place an order 402 to purchase an item 404 of the merchant 126 through a neighborhood social network. The social network may be a neighborhood social network (e.g., Fatdoor.com and/or Netdoor.com). Users of the social network (e.g., the occupiers 110) may be able to claim their residential and/or public (e.g., work) location in the residential community 108 (e.g., neighborhood). The occupier 110 may be able to place the order 402 in the form of the request 116 made to the centralized server 100 associated with the neighborhood social network.

The direction algorithm may communicatively direct the shopping cart 120 associated with each occupier 110 (e.g., the occupier 110, each occupier of the home 114 associated with the shopping cart 120, and/or each occupier 110 in the residential community 108) to the merchant 126 and/or other neighbors (e.g., occupiers 110) in the residential community 108 when the shopping cart 120 is placed on the autonomous platform 119 associated with each occupant based on the request 116 of the particular occupier 110 in control of a particular autonomous platform 119. The direction algorithm may communicatively direct the shopping cart 120 based on the set of instructions 118 generated based on the request 116 of the occupier 110. In one embodiment, occupiers 110 and/or merchants 126 may be able to prevent certain shopping carts 120 from being directed to certain boarding locations 128. For example, a particular merchant 126 may be able to block a particular occupier 110 (e.g., prevent the shopping cart 120 associated with the occupier 110 from being directed to the boarding location 128 associated with the merchant 126).

The message algorithm 212 may automatically communicate a message 124 (e.g., the message 124 of FIG. 1) to the merchant 126 when the particular occupier 110 places the order 402 to purchase the item 404 of the merchant 126. In one embodiment, the message 124 may include detail about the occupier 110 that sent the order 402 (e.g., in the form of the request 116), the boarding location 128 associated with the occupier 110, the autonomous platform 119 associated with the occupier 110 and/or the shopping cart 120 associated with the occupier 110 and/or the boarding location 128. The message 124 may include information about the request 116, the order 402, a set of instructions 118, a voice and/or textual message 124 from the occupier 110, a desired time of delivery, an estimated time of arrival, and/or a payment means (e.g., credit card information of the occupier 110).

FIG. 3 is a table view 350 illustrating data relationships between the occupier 110, the request 116, and the shopping cart 120, according to one embodiment. In one embodiment, the occupier 110 may be associated with the home 114, request 116, boarding location 128, and/or shopping cart 120. A status of the shopping cart 304 may be an operational status of the shopping cart 304 and/or a task status of the shopping cart 304. The occupier 110 may have a home 114 boarding location 128 (e.g., the boarding location 128 associated with the verified address of the occupant on the neighborhood social network) and/or a public boarding location 128 (e.g., a work boarding location 128 in the property boundary 112 of the occupant's place of business).

In one embodiment, occupiers 110 in the residential community 108 may be able to allow other occupiers 110 to use (e.g., rent and/or borrow) their boarding location(s) 128 and/or autonomous platform(s) 119. The occupier 110 may be able to approve other users in the residential community 108 and/or specify dates and/or times when other occupiers 110 may use the boarding location (s) 128 and/or autonomous platform(s) 119. There may be public boarding locations 128 (e.g., at parks and/or throughout the residential community 108) that may enable shopping carts 120 to deliver items to occupiers 110 when they are not at the boarding locations 128 they are associated with (e.g., the home 114 boarding location 128 and/or the work boarding location 128).

Figure 4:
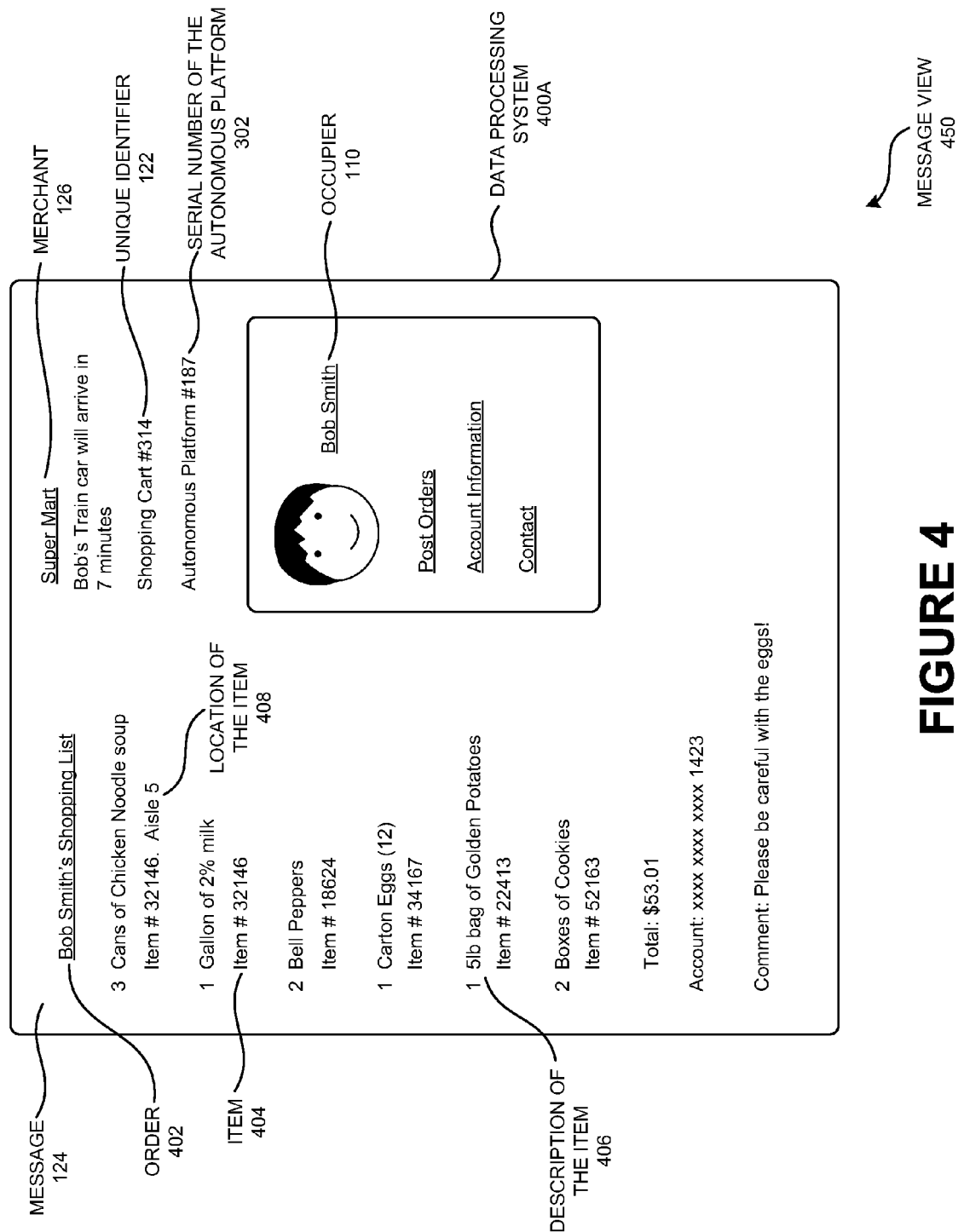
FIG. 4 is a message view showing a processing device of the merchant of FIG. 1 receiving a message, according to one embodiment.

FIG. 4 is a message view 450 showing a processing device of the merchant of FIG. 1 receiving a message, according to one embodiment. In particular, FIG. 4 shows a data processing system 400A, an order 402, an item 404, a description of the item 406, and a location of the item 408. The message 124 may be generated based on the request 116 and/or may be communicated to the data processing system 400 through the network 101. The message 124 may contain the order 402 and/or additional information. In one embodiment, the message 124 may enable the merchant 126 may be able to connect (e.g., communicate) with the occupier 110. The message 124 may contain contact information of the occupier 110 that sent the request 116 (e.g., a phone number and/or a link to the occupier's 110 profile on the neighborhood social network).

In one embodiment, the order 402 may be in the form of a shopping list and/or may contain information about the items desired, the payment method, and/or other additional details. The item 404 may be a good desired by the occupier 110. The description of the item 406 may be a name of the item, a description of the item 406 (e.g., size, color, model), and/or amount of the item 404 desired from the merchant 126. The merchant 126 may be a company, a business, an owner, a worker, and/or an establishment.

The location of the item 408 may be a location in a warehouse of the merchant 126, a geo-spatial location (e.g., the last geo-spatial location at which the item 404 was logged), and/or a location (e.g., a building 702) where the item 404 is located. The serial number of the autonomous platform 302 may be a unique identifier 122 of the autonomous platform 119 associated with the occupier 110 whose request 116 triggered the message 124. The message 124 may also include the boarding location 128 and/or a serial number of the boarding location 128 that the shopping cart 120 is being routed to.

The message 124 may include a comment from the occupier 110. The comment may be a voice and/or textual message 124 composed by the occupier 110 and/or may include a special request 116. The message 124 may include an estimated time of arrival of the shopping cart 120, a time until arrival of the shopping cart 120, a map view 504 through which the merchant 126 may track the progress of the shopping cart 120, and/or the account information of the occupant (e.g., the occupant's credit card information). In one embodiment, the merchant 126 may be able to view past orders 402 of the occupier 110, past comments from the occupier 110, and/or communications between the merchant 126 and the occupier 110 using the data processing system 400A.

Figure 5:
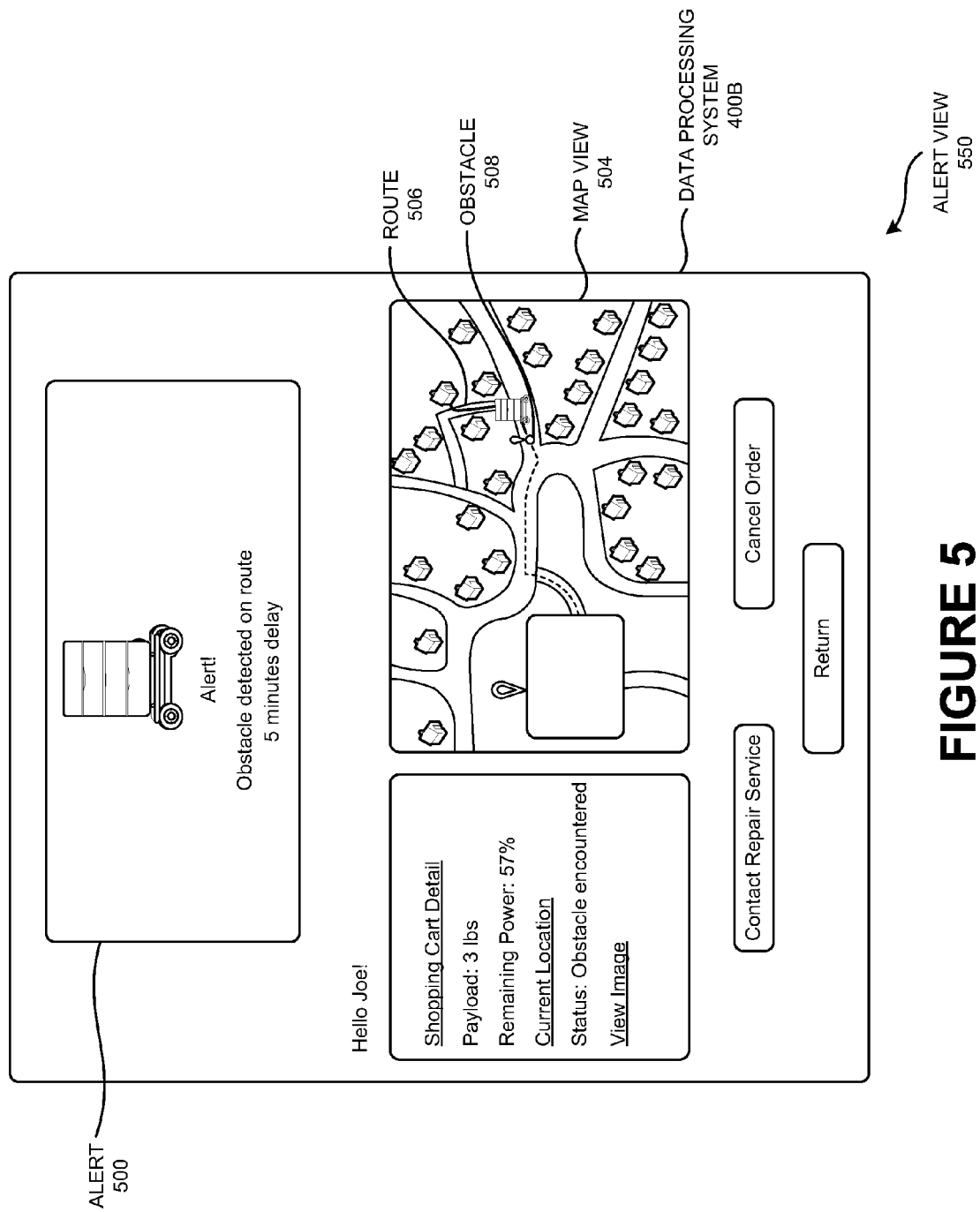
FIG. 5 is an alert view of a data processing system of the occupier of FIG. 1 receiving an alert notifying the occupier that the shopping cart has detected an obstacle, according to one embodiment.

FIG. 5 is an alert view 550 of a data processing system of the occupier of FIG. 1 receiving an alert notifying the occupier that the shopping cart has detected an obstacle, according to one embodiment. FIG. 5 shows an alert 500, a map view 504, a route 506, and an obstacle 508.

The alert 500 may be sent as a push notification to the data processing system 400B of the occupier 110. The alert 500 may notify the occupier 110 that the shopping cart 120 has encountered a problem, delay, and/or is experiencing a malfunction (e.g., a system failure, a mechanical malfunction and/or an electrical malfunction). The alert 500 may be triggered when the shopping cart 120 senses an obstacle 508. The obstacle 508 may be an obstruction on the train track 132 and/or an obstruction that prevents and/or inhibits the shopping cart's progress and/or poses a danger to the shopping cart 120 and/or its contents.

The obstacle 508 may be sensed by a sensor of the shopping cart 120. The sensor may include an ultrasound sensor, a radar sensor, a laser sensor, an optical sensor, and/or a mixed signal sensor. The sensor may comprise multiple sensors working in concert. A sensory fusion algorithm may be used to process sensor data.

The alert 500 may inform the occupier 110 of the nature and/or type of the obstacle 508 and/or nature of the progress of the shopping cart 120 (e.g., delays, malfunctions, and/or delivery status). The occupier 110 may be able to request 116 more information about the alert 500 (e.g., the alternate route 506 the shopping cart 120 will use to complete the delivery if an obstacle 508 is sensed). In one embodiment, the alert 500 may include the map view 504 through which the progress of the shopping cart 120 may be tracked in the residential community 108. The map view 504 may show the route 506 of the shopping cart 120 and/or alternate routes available to the shopping cart 120. The map view 504 may display the locations and/or progress of other shopping carts and/or autonomous platforms 119 in the residential community 108, along the route 506, and/or around a current location of the shopping cart 120. The obstacle 508, location of a malfunction, delay, and/or problem may be represented on the map view 504, according to one embodiment. The occupier 110 may be able to switch between multiple map views 504 (e.g., satellite map view 504 and/or a ground level view) and/or a feed from the shopping cart 120 (e.g., a live video feed).

The alert 500 may include details about the shopping cart 120 and/or the request 116 the shopping cart 120 is fulfilling. In particular, the alert 500 may contain information regarding a payload of the shopping cart 120 (e.g., a weight of items in the shopping cart 120), an environmental state of a container of the shopping cart 120 (e.g., a temperature and/or humidity of the container and/or contents in the container), and/or an image and/or video of the contents of the shopping cart 120. In one embodiment, the occupier 110 may be able to view the current location of the shopping cart 120 (e.g., on a map view 504, through a set of geo-spatial coordinates, and/or through photographs and/or video from the shopping cart 120). The alert 500 may include the remaining power supply and/or information about an obstacle 508, delay, and/or problem encountered. The occupier 110 may be able to view any number of details about the nature of the encountered issue and/or actions taken or to be taken to traverse the issue.

In one embodiment, the alert 500 may prompt and/or enable the occupier 110 to contact a repair service. For example, the repair service may be automatically contacted when the shopping cart 120 detects a break in the train track 132, an obstruction, and/or a system failure. The occupier 110 may be allowed to voluntarily contact the repair services upon receiving the alert 500 (e.g., if the alert 500 regards a failure of the shopping cart 120 associated with the occupier 110). A return function may allow the occupier 110 to instruct the shopping cart 120 to return to a predetermined location (e.g., the boarding location 128 associated with the shopping cart 120 and/or the last boarding location 128 at which the shopping cart 120 arrived (e.g., the boarding location 128 of the merchant 126). The occupier 110 may be able to cancel an order 402 at any time. The order 402 may need to be canceled within a set amount of time after the order 402 was placed (e.g., through receipt of the request 116), within a set amount of time after the merchant 126 fulfilled the request 116, and/or before the shopping cart 120 has reached the destination (e.g., the merchant 126 and/or boarding location 128 of a neighbor in the residential community 108).

Figure 6:
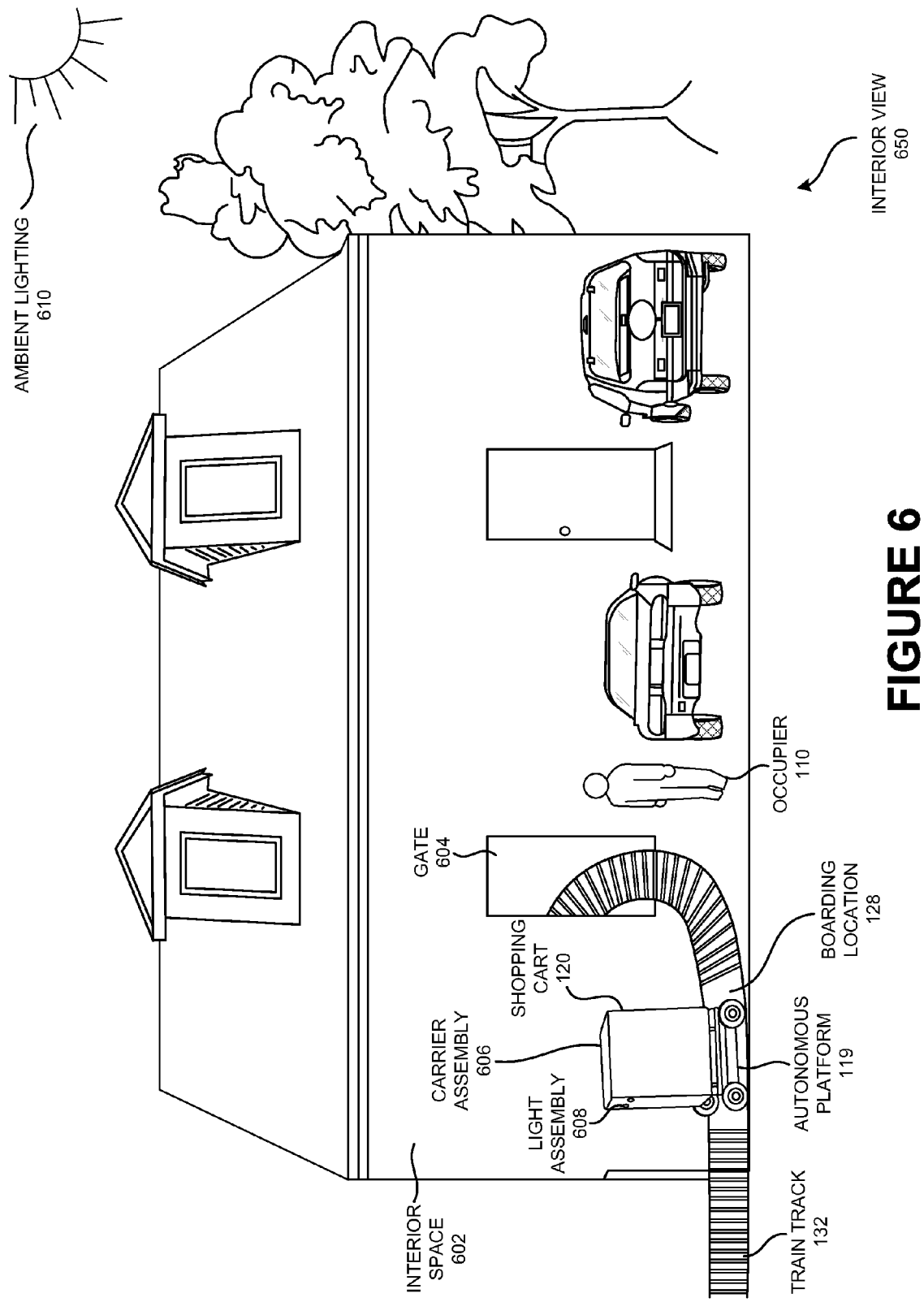
FIG. 6 is an interior view of a boarding location in an interior space of the home of the occupier of FIG. 1, according to one embodiment.

FIG. 6 is an interior view 650 of a boarding location in an interior space of the home of the occupier of FIG. 1, according to one embodiment. In particular, FIG. 6 shows an interior space 602, a gate 604, a carrier assembly 606, a light assembly 608, and an ambient lighting 610. In one embodiment, the boarding location 128 may be located in the home 114 (e.g., in the interior space 602 of the home 114). The train track 132 may run through the interior space 602 and/or the shopping cart 120 and/or the autonomous platform 119 may be able to autonomously route 506 itself from the train track 132 to the boarding location 128 in the interior space 602.

The home 114 and/or the building 702 (e.g., the building 702) may include the gate 604 (e.g., a gate 604 with a sealing mechanism (e.g., a door)) through which the shopping cart 120 may travel. The gate 604 may open and/or close automatically when the shopping cart 120 and/or autonomous platform 119 reaches a threshold distance from the gate 604 and/or upon receipt of a command from the autonomous platform 119, shopping cart 120, and/or centralized server 100. The shopping cart 120 and/or autonomous platform 119 may include the light assembly 608 (e.g., a set of light emitting diodes) that automatically provides lighting when the ambient lighting 610 dips below a threshold level. Multiple assemblies may be capable of being attached to the shopping cart 120 and/or the autonomous platform 119. The assembly (e.g., the shopping cart 120) may be a box assembly, a carrier assembly 606, a locker assembly, and/or a person transporter rover assembly.

Figure 7:
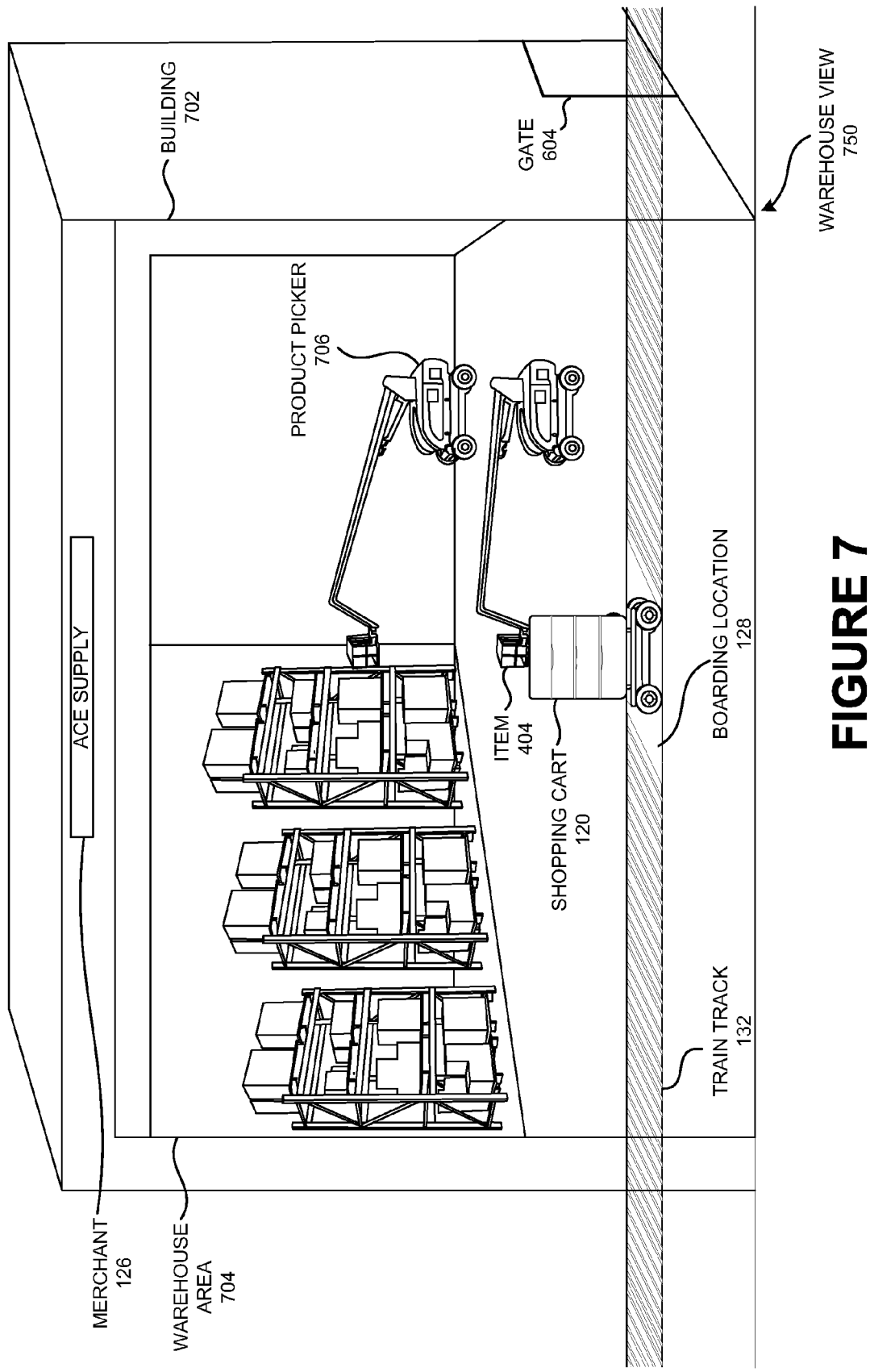
FIG. 7 is a warehouse view of a product picker loading items into a shopping cart, according to one embodiment.

FIG. 7 is a warehouse view 750 of a product picker loading items into a shopping cart, according to one embodiment. FIG. 7 shows a building 702, a warehouse, and a product picker 706. In one embodiment, the building 702 of the merchant 126 may include the warehouse section. The warehouse section may be a store room and/or a part of the building 702 where inventory is kept.

The building 702 may house product pickers 706 that may be autonomous and/or semi-autonomous robots capable of locating, accessing, and/or moving items in the building 702. In one embodiment, the product picker(s) 706 may locate, acquire, and/or load items in the shopping cart 120 based on the message 124 received from the centralized server 100. The building 702 may have gates 604 and/or boarding location(s) 128 located in the interior space 602 of the building 702. The product pickers 706 may enable the process of shopping carts 120 being provided with appropriate cargo to be automated, removing (e.g., largely removing and/or completely removing) the need for human involvement in the process of completing requests 116 sent by occupiers 110.

Figure 8:
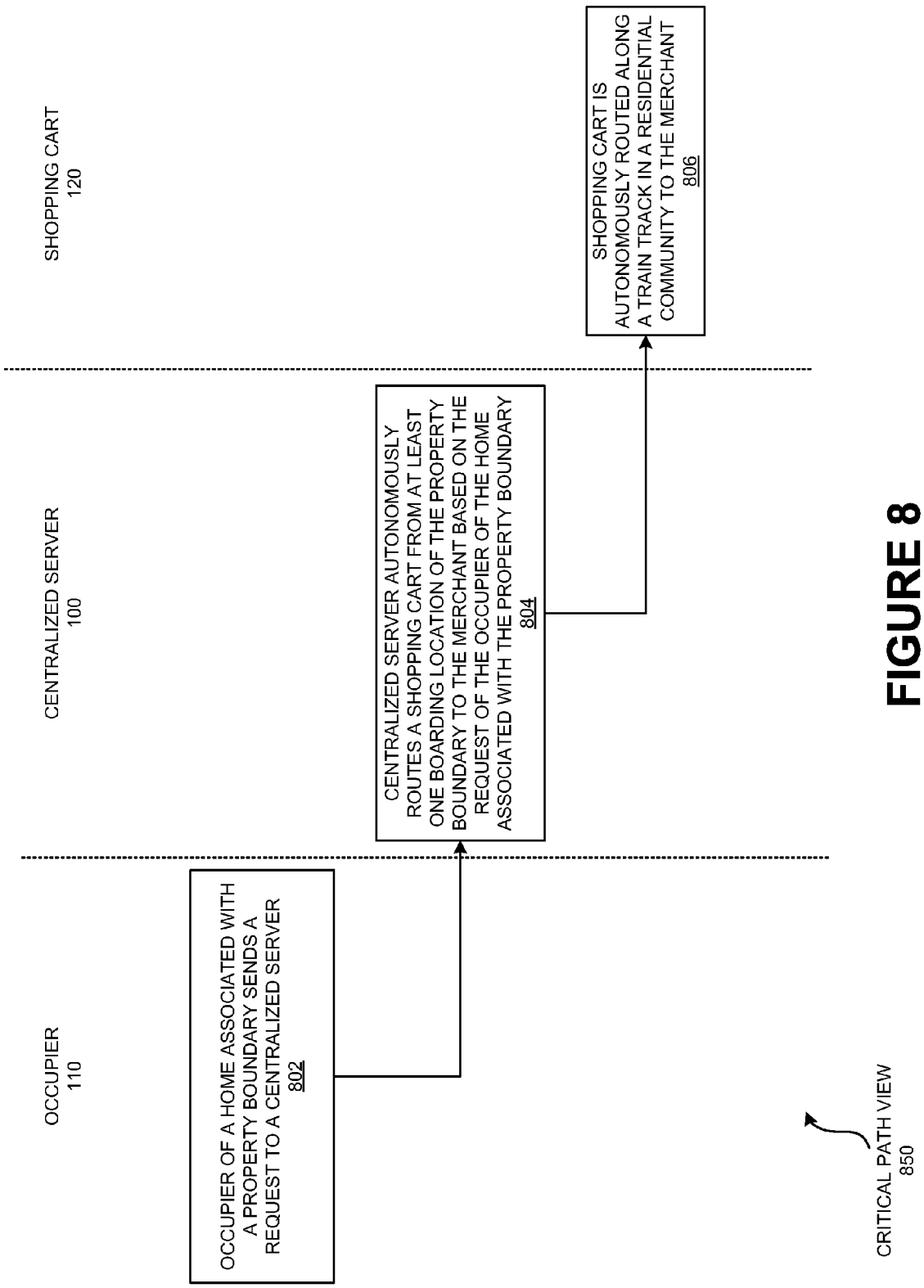
FIG. 8 is a critical path view illustrating a flow based on time in which critical operations in delivering a requested item by autonomously routing a shopping cart on a train track in a residential community, according to one embodiment.

FIG. 8 is a critical path view 850 illustrating a flow based on time in which critical operations in delivering a requested item by autonomously routing a shopping cart on a train track in a residential community, according to one embodiment.

In operation 802, an occupier 110 of a home 114 associated with a property boundary 112 sends a request 116 to the centralized server 100 through the network 101. The centralized server 100 autonomously routes a shopping cart 120 from a boarding location 128 of the property boundary 112 to a merchant 126 based on the request 116 of the occupier 110 of the home 114 associated with the property boundary 112 in operation 804. In operation 806, the shopping cart 120 is autonomously routed along a train track 132 in a residential community 108 to the merchant 126.

Figure 9:
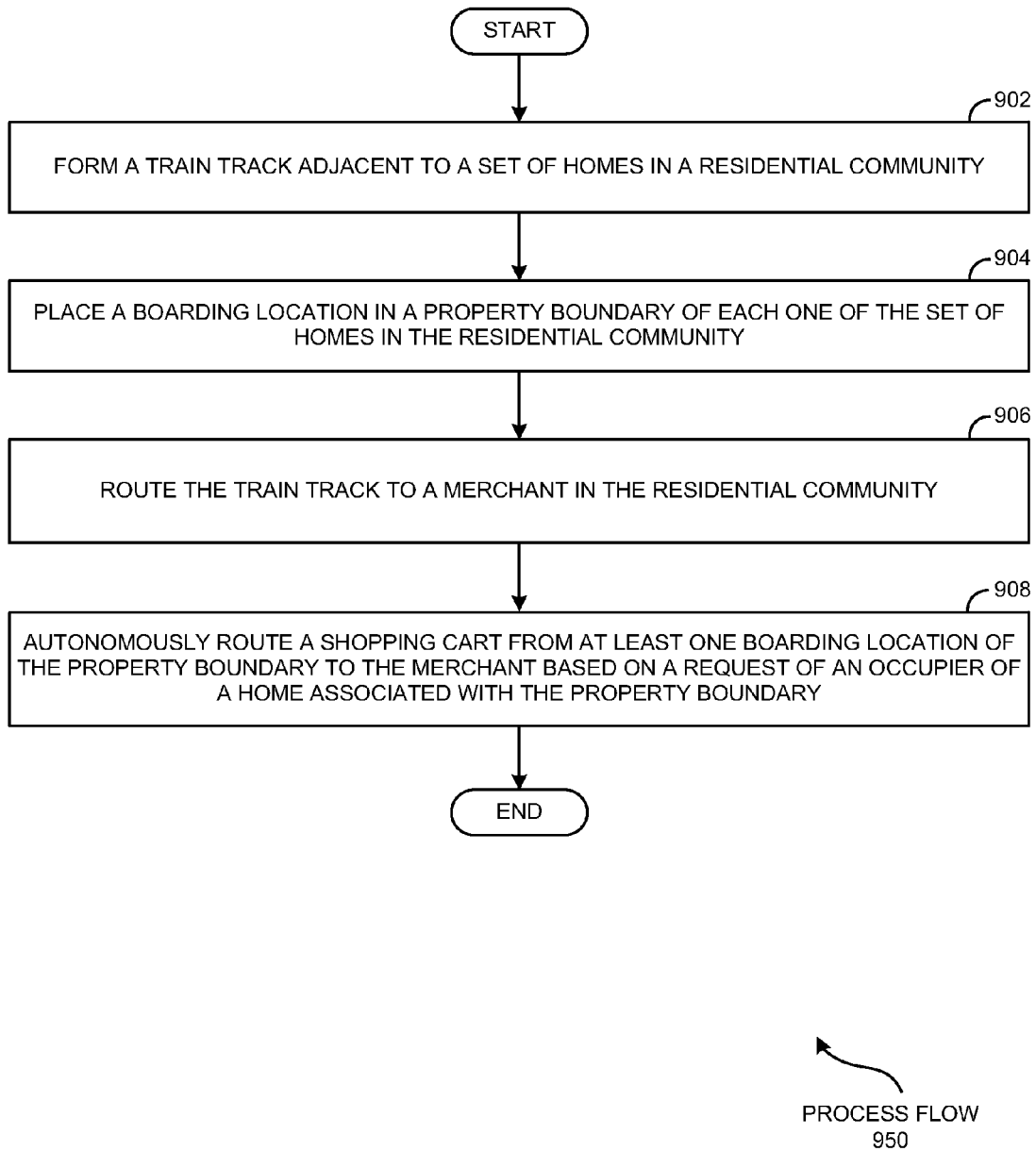
FIG. 9 is a process flow of autonomously routing a shopping cart on a train track in a residential community based on the request of the occupier of a home in the residential community of FIG. 1, according to one embodiment.

FIG. 9 is a process flow 950 of autonomously routing a shopping cart on a track in a residential community based on the request of the occupier of a home in the residential community of FIG. 1, according to one embodiment.

Operation 902 may form a train track 132 adjacent to a set of homes 130 in a residential community 108. A boarding location 128 may be placed in a property boundary 112 of each of the set of homes 130 in the residential community 108 in operation 904. Operation 906 may route the train track 132 to a merchant 126 in the residential community 108. A shopping cart 120 may be autonomously routed from at least one boarding location 128 of the property boundary 112 to the merchant 126 based on a request 116 to the merchant 126 based on a request 116 of an occupier 110 of a home 114 associated with the property boundary 112 in operation 908.

Disclosed are a method and system of a train based community, according to one embodiment. In one embodiment, a method includes forming a train track 132 adjacent to a set of homes 130 in a residential community 108, placing a boarding location 128 in a property boundary 112 of each one of the set of homes 130 in the residential community 108, and routing the train track 132 to a merchant 126 in the residential community 108. A shopping cart 120 is autonomously routed from at least one boarding location 128 of the property boundary 112 to the merchant 126 based on a request 116 of an occupier 110 of a home 114 associated with the property boundary 112.

It may be determine that the shopping cart 120 is placed on an autonomous platform 119 associated with the occupier 110 of the home 114 associated with the property boundary 112. The shopping cart 120 may be autonomously routed to the merchant 126 when the shopping cart 120 is placed on the autonomous platform 119. It may be determined that the autonomous platform 119 with the shopping cart 120 is sharing the train track 132 with other autonomous platforms 119 each with shopping carts 120 of other occupiers 110 of other homes 114 in the residential community 108.

The autonomous platform 119 and/or the shopping cart 120 may be permitted to communicate with at least one of neighboring autonomous platforms 119 and neighboring shopping carts 120 through a centralized server 100 (through a wide area network 101) and/or a local area network 101 formed between adjacent ones of the autonomous platform 119 and/or the shopping cart 120 and/or neighboring autonomous platforms 119 and/or neighboring shopping carts 120. The centralized server 100 may include an electronic commerce algorithm 208 through which each occupier 110 of each home 114 of the residential community 108 place an order 402 to purchase an item 404 of the merchant 126 through a neighborhood social network. The autonomous platforms 119 associated with each occupier 110 may be communicatively directed to the merchant 126 and/or other neighbors of the residential community 108 when the shopping cart 120 is placed on the autonomous platform 119 associated with each occupant based on a request 116 of a particular occupier 110 in control of a particular autonomous platform 119.

A message 124 may be automatically communicated to the merchant 126 when the particular occupier 110 places the order 402 to purchase the item 404 of the merchant 126. The message 124 may include a description of the item, a location of the item, an identification of the particular occupier 110, a serial number of the particular autonomous platform 119, and/or a unique identifier 122 of a particular shopping cart 120 associated with the particular autonomous platform 119. The shopping cart 120 may arrive in an interior space 602 of a particular home 114 associated with the particular occupier 110 through a gate 604 through which the particular autonomous platform 119 associated with the particular shopping cart 120 is transportable. The boarding location 128 may be located in the interior space 602 of the home 114.

The particular autonomous platform 119 and/or the particular shopping cart 120 includes a light assembly 608 such that the at least one of the particular autonomous platform 119 and the particular shopping cart 120 automatically provides lighting in when an ambient lighting 610 level dips below a threshold value. A building 702 of the merchant 126 may include a product picker 706 in a warehouse area 704 of the merchant 126 at which the item 404 is loaded when the message 124 is received. The particular autonomous platform 119 and/or the particular shopping cart 120 may detect an obstacle 508 when on a route 506 between the particular home 114 and the merchant 126. The obstacle 508 may be a street, a pedestrian, and/or an object on the train track 132 impeding progress of the particular autonomous platform 119 and/or the particular shopping cart 120.

Multiple different types of assemblies (e.g., a box assembly, a carrier assembly 606, a locker assembly, and/or a person transporter rover assembly) may be attachable to the particular autonomous platform 119. The shopping cart 120 may be personal to the occupier 110. The residential community 108 may be a master planned community.

In another embodiment, a method includes forming a train track 132 adjacent to a set of homes 130 in a residential community 108, placing a boarding location 128 in a property boundary 112 of each one of the set of homes 130 in the residential community 108, routing the train track 132 to a merchant 126 in the residential community 108, and determining that a shopping cart 120 is placed on an autonomous platform 119 associated with an occupier 110 of a home 114 associated with the property boundary 112. The shopping cart 120 may be autonomously routed to the merchant 126 when the shopping cart 120 is placed on the autonomous platform 119.

The shopping cart 120 may be autonomously routed from at least one boarding location 128 of the property boundary 112 to the merchant 126 based on a request 116 of the occupier 110 of the home 114 associated with the property boundary 112. It may be determined that the autonomous platform 119 with the shopping cart 120 is sharing the train track 132 with other autonomous platforms 119 each with shopping carts 120 of other occupiers 110 of other homes 114 in the residential community 108. The autonomous platform 119 and/or the shopping cart 120 may be permitted to communicate with at least one of neighboring autonomous platforms 119 and neighboring shopping carts 120 through a centralized server 100 (through a wide area network) and/or a local area network formed between adjacent ones of the autonomous platform 119 and/or the shopping cart 120 and neighboring autonomous platforms 119 and/or neighboring shopping carts 120.

The centralized server 100 may include an electronic commerce algorithm 208 through which each occupier 110 of each home 114 of the residential community 108 to place an order 402 to purchase an item 404 of the merchant 126 through a neighborhood social network. The autonomous platforms 119 associated with each occupier 110 are communicatively directed to at least one of the merchant 126 and other neighbors of the residential community 108 when the shopping cart 120 is placed on the autonomous platform 119 associated with each occupant based on a request 116 of a particular occupier 110 in control of a particular autonomous platform 119. A message 124 may be automatically communicated to the merchant 126 when the particular occupier 110 places the order 402 to purchase the item 404 of the merchant 126.

The message 124 may include a description of the item, a location of the item, an identification of the particular occupier 110, a serial number of the particular boarding location 128, and/or a unique identifier 122 of a particular shopping cart 120 associated with the particular autonomous platform 119. The shopping cart 120 may arrive in an interior space 602 of a particular home 114 associated with the particular occupier 110 through a gate 604 through which the particular autonomous platform 119 associated with the particular shopping cart 120 is transportable. The boarding location 128 may be located in the interior space 602 of the home 114.

The particular autonomous platform 119 and/or the particular shopping cart 120 may include a light assembly 608 such that the particular autonomous platform 119 and/or the particular shopping cart 120 automatically provides lighting in when an ambient lighting 610 level dips below a threshold value. A building 702 of the merchant 126 may include a product picker 706 in a warehouse area 704 of the merchant 126 at which the item 404 is loaded when the message 124 is received. The particular autonomous platform 119 and/or the particular shopping cart 120 may detect an obstacle 508 when on a route 506 between the particular home 114 and the merchant 126.

The obstacle 508 may be a street, a pedestrian, and/or an object on the train track 132 impeding progress of the particular autonomous platform 119 and/or the particular shopping cart 120. Multiple different types of assemblies may be attachable to the particular autonomous platform 119. The multiple assemblies may include a box assembly, a carrier assembly 606, a locker assembly, and/or a person transporter rover assembly. The shopping cart 120 may be personal to the occupier 110 the residential community 108 may be a master planned community.

In yet another embodiment, a residential community 108 includes a train track 132 formed adjacent to a set of homes 130 in a residential community 108 and routed to a merchant 126 in the residential community 108. A boarding location 128 is placed in a property boundary 112 of each one of the set of homes 130 in the residential community 108. The residential community 108 also includes a shopping cart 120 to autonomously route 506 from at least one boarding location 128 of the property boundary 112 to the merchant 126 based on a request 116 of an occupier 110 of a home 114 associated with the property boundary 112.

A placement algorithm 200 may determine that the shopping cart 120 is placed on an autonomous platform 119 associated with the occupier 110 of the home 114 associated with the property boundary 112. A routing algorithm 202 may autonomously route 506 the shopping cart 120 to the merchant 126 when the shopping cart 120 is placed on the autonomous platform 119. A sharing algorithm 204 may determine that the autonomous platform 119 with the shopping cart 120 is sharing the train track 132 with other autonomous platforms 119 each with shopping carts 120 of other occupiers 110 of other homes 114 in the residential community 108.

A communication algorithm 206 may permit the autonomous platform 119 and/or the shopping cart 120 to communicate with neighboring autonomous platforms 119 and/or neighboring shopping carts 120 through a centralized server 100 (through a wide area network) and/or a local area network formed between adjacent ones of the autonomous platform 119 and/or the shopping cart 120 and neighboring autonomous platforms 119 and/or neighboring shopping carts 120. An electronic commerce algorithm 208 may enable each occupier 110 of each home 114 of the residential community 108 to place an order 402 to purchase an item 404 of the merchant 126 through a neighborhood social network. A direction algorithm to communicatively direct the shopping cart 120 associated with each occupier 110 to at least one of the merchant 126 and other neighbors of the residential community 108 when the shopping cart 120 is placed on the boarding location 128 associated with each occupant based on a request 116 of a particular occupier 110 in control of a particular autonomous platform 119.

A message algorithm 212 may automatically communicate a message 124 to the merchant 126 when the particular occupier 110 places the order 402 to purchase the item 404 of the merchant 126. The message 124 may include a description of the item, a location of the item, an identification of the particular occupier 110, a serial number of the particular autonomous platform 119, and/or a unique identifier 122 of a particular shopping cart 120 associated with the particular autonomous platform 119. The shopping cart 120 may arrive in an interior space 602 of a particular home 114 associated with the particular occupier 110 through a gate 604 through which the particular autonomous platform 119 associated with the particular shopping cart 120 is transportable. The boarding location 128 may be located in the interior space 602 of the home 114.

The particular autonomous platform 119 and/or the particular shopping cart 120 may include a light assembly 608 such that the particular autonomous platform 119 and/or the particular shopping cart 120 automatically provides lighting in when an ambient lighting 610 level dips below a threshold value. A building 702 of the merchant 126 may include a product picker 706 in a warehouse area 704 of the merchant 126 at which the item 404 is loaded when the message 124 is received.

The particular autonomous platform 119 and/or the particular shopping cart 120 may detect an obstacle 508 when on a route 506 between the particular home 114 and the merchant 126. The obstacle 508 may be a street, a pedestrian, and/or an object on the train track 132 impeding progress of the particular autonomous platform 119 and/or the particular shopping cart 120. Multiple different types of assemblies (e.g., a box assembly, a carrier assembly 606, a locker assembly, and/or a person transporter rover assembly) may be attachable to the particular autonomous platform 119. The shopping cart 120 may be personal to the occupier 110. The residential community 108 may be a master planned community.

An example embodiment will now be described. In one example embodiment, Lisa may have a home 114 in the residential community 108. She may have her own shopping cart 120 associated with a boarding location 128 in her home 114. She may be able to use the shopping cart 120 to complete errands rather than having to do her shopping and other errands on her own.

Lisa may be able to send a request 116 to have the contents of her shopping list delivered to her house. In one embodiment, the store from where the items are desired may receive the shopping list in the form of a message 124. The store (e.g., the merchant 126) may load a shopping cart 120 associated with the merchant 126 and/or route 506 the shopping cart 120 along a train track 132 integrated in the residential community 108 to the boarding location 128 associated with Lisa. The shopping cart 120 may be autonomously routed back to the merchant 126 once the contents have been removed, Lisa confirms delivery, and/or payment has been made.

Lisa's shopping cart 120 may be autonomously routed along the train track 132 from the boarding location 128 associated with Lisa to the merchant 126 based on the request 116. The merchant 126 may load the desired items on and/or in the shopping cart 120 and/or the shopping cart 120 may be routed from a boarding location 128 of the merchant 126 to Lisa's boarding location 128.

In another example embodiment, Mike may not have time to run his errands and/or may not want to spend time and/or money transporting goods. Mike may use a shopping cart 120 to deliver his dry cleaning to his favorite dry cleaner. He may place his dirty clothing in the shopping cart 120, lock the shopping cart 120, and/or set a passcode to open the shopping cart 120. He may send a request 116 to have the shopping cart 120 routed to the dry cleaner and may specify his order 402 (e.g., starch, pressed, folded, and/or desired time of pick up). A message 124 may be sent to the merchant 126 (e.g., the dry cleaner) based on the request 116. The message 124 may contain the passcode set by Mike so that the dry cleaner may unlock the contents of the shopping cart 120. The dry cleaner may send the cleaned clothing back to Mike's boarding location 128 (e.g., the boarding location 128 in the property boundary 112 associated with Mike's home 114) when the request 116 has been completed.

In yet another example embodiment, a family, the Johnsons, may be on a picnic in a park in the residential community 108. They may realize that they forgot items they would like for their picnic. The park may have a public boarding location 128. The Johnsons may be able to send a request 116 for the desired items to be delivered from a helpful neighbor (e.g., a friend on the neighborhood social network) to the public boarding location 128 at the park. The shopping cart 120 associated with the Johnsons (e.g., the shopping cart 120 associated with the boarding location 128 in the property boundary 112 of the Johnson's home 114) may be routed to the appropriate neighbor and/or from the neighbor to the boarding location 128 of the park.

Although the present embodiments have been described with reference to specific example embodiments, it will be evident that various modifications and changes may be made to these embodiments without departing from the broader spirit and scope of the various embodiments. For example, the various devices, algorithms, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated ASIC circuitry and/or in Digital Signal; Processor DSP circuitry).

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A method, comprising:

forming a train track adjacent to a set of homes in a residential community;

placing a boarding location in a property boundary of each one of the set of homes in the residential community;

routing the train track to a merchant in the residential community;

autonomously routing a shopping cart from at least one boarding location of the property boundary to the merchant based on a request of an occupier of a home associated with the property boundary; and autonomously routing the shopping cart to the merchant when the shopping cart is placed on an autonomous platform.

2. The method of claim 1 further comprising:

determining that the shopping cart is placed on the autonomous platform associated with the occupier of the home associated with the property boundary.

3. The method of claim 2 further comprising:

determining that the autonomous platform with the shopping cart is sharing the train track with other autonomous platforms each with shopping carts of other occupiers of other homes in the residential community; and permitting at least one of the autonomous platform and the shopping cart to communicate with at least one of neighboring autonomous platforms and neighboring shopping carts through an at least one of:

a centralized server through a wide area network, and a local area network formed between adjacent ones of the at least one of the autonomous platform and the shopping cart and at least one of neighboring autonomous platforms and neighboring shopping carts.

4. The method of claim 3:

wherein the centralized server includes an electronic commerce algorithm through which each occupier of each home of the residential community to place an order to purchase an item of the merchant through a neighborhood social network, and wherein the autonomous platforms associated with each occupier are communicatively directed to at least one of the merchant and other neighbors of the residential community when the shopping cart is placed on the autonomous platform associated with each occupant based on a request of a particular occupier in control of a particular autonomous platform.

5. The method of claim 4 further comprising:

automatically communicating a message to the merchant when the particular occupier places the order to purchase the item of the merchant, wherein the message includes at least one of a description of the item, a location of the item, an identification of the particular occupier, a serial number of the particular autonomous platform, and a unique identifier of a particular shopping cart associated with the particular autonomous platform, wherein the shopping cart arrives in an interior space of a particular home associated with the particular occupier through a gate through which the particular autonomous platform associated with the particular shopping cart is transportable, and wherein the boarding location is located in the interior space of the home.

6. The method of claim 5:

wherein at least one of the particular autonomous platform and the particular shopping cart includes a light assembly such that the at least one of the particular autonomous platform and the particular shopping cart automatically provides lighting in when an ambient lighting level dips below a threshold value, wherein a building of the merchant includes a product picker in a warehouse area of the merchant at which the item is loaded when the message is received, and wherein at least one of the particular autonomous platform and the particular shopping cart detects an obstacle when on a route between the particular home and the merchant, wherein the obstacle is at least one of a street, a pedestrian, and an object on the train track impeding progress of the at least one of the particular autonomous platform and the particular shopping cart.

7. The method of claim 6:

wherein multiple different types of assemblies are attachable to the particular autonomous platform comprising any one of a box assembly, a carrier assembly, a locker assembly, and a person transporter rover assembly, wherein the shopping cart is personal to the occupier, and wherein the residential community is a master planned community.

8. A method, comprising:

forming a train track adjacent to a set of homes in a residential community;

placing a boarding location in a property boundary of each one of the set of homes in the residential community;

routing the train track to a merchant in the residential community;

determining that a shopping cart is placed on an autonomous platform associated with an occupier of a home associated with the property boundary;

autonomously routing the shopping cart to the merchant when the shopping cart is placed on the autonomous platform; and autonomously routing the shopping cart from at least one boarding location of the property boundary to the merchant based on request of the occupier of the home associated with the property boundary.

9. The method of claim 8 further comprising:

determining that the autonomous platform with the shopping cart is sharing the train track with other autonomous platforms each with shopping carts of other occupiers of other homes in the residential community; and permitting at least one of the autonomous platform and the shopping cart to communicate with at least one of neighboring autonomous platforms and neighboring shopping carts through an at least one of:

a centralized server through a wide area network, and a local area network formed between adjacent ones of the at least one of the autonomous platform and the shopping cart and at least one of neighboring autonomous platforms and neighboring shopping carts.

10. The method of claim 9:

wherein the centralized server includes an electronic commerce algorithm through which each occupier of each home of the residential community to place an order to purchase an item of the merchant through a neighborhood social network, and wherein the autonomous platforms associated with each occupier are communicatively directed to at least one of the merchant and other neighbors of the residential community when the shopping cart is placed on the autonomous platform associated with each occupant based on a request of a particular occupier in control of a particular autonomous platform.

11. The method of claim 10 further comprising:
automatically communicating a message to the merchant when the particular occupier places the order to purchase the item of the merchant,
wherein the message includes at least one of a description of the item, a location of the item, an identification of the particular occupier, a serial number of the particular boarding location, and a unique identifier of a particular shopping cart associated with the particular autonomous platform,
wherein the shopping cart arrives in an interior space of a particular home associated with the particular occupier through a gate through which the particular autonomous platform associated with the particular shopping cart is transportable, and
wherein the boarding location is located in the interior space of the home.

12. The method of claim 11:
wherein at least one of the particular autonomous platform and the particular shopping cart includes a light assembly such that the at least one of the particular autonomous platform and the particular shopping cart automatically provides lighting in when an ambient lighting level dips below a threshold value,
wherein a building of the merchant includes a product picker in a warehouse area of the merchant at which the item is loaded when the message is received, and
wherein at least one of the particular autonomous platform and the particular shopping cart detects an obstacle when on a route between the particular home and the merchant, wherein the obstacle is at least one of a street, a pedestrian, and an object on the train track impeding progress of the at least one of the particular autonomous platform and the particular shopping cart.

13. The method of claim 12:
wherein multiple different types of assemblies are attachable to the particular autonomous platform comprising any one of a box assembly, a carrier assembly, a locker assembly, and a person transporter rover assembly,
wherein the shopping cart is personal to the occupier, and
wherein the residential community is a master planned community.

14. A residential community, comprising:
a train track formed adjacent to a set of homes in a residential community and routed to a merchant in the residential community,
wherein a boarding location is placed in a property boundary of each one of the set of homes in the residential community; and
a shopping cart to autonomously route from at least one boarding location of the property boundary to the merchant based on a request of an occupier of a home associated with the property boundary,
wherein a routing algorithm to autonomously route the shopping cart to the merchant when the shopping cart is placed on an autonomous platform.

15. The residential community of claim 14 further comprising:
a placement algorithm to determine that the shopping cart is placed on the autonomous platform associated with the occupier of the home associated with the property boundary.

16. The residential community of claim 15 further comprising:
a sharing algorithm to determine that the autonomous platform with the shopping cart is sharing the train track with other autonomous platforms each with shopping carts of other occupiers of other homes in the residential community; and
a communication algorithm to permit at least one of the autonomous platform and the shopping cart to communicate with at least one of neighboring autonomous platforms and neighboring shopping carts through an at least one of:
a centralized server through a wide area network, and
a local area network formed between adjacent ones of the at least one of the autonomous platform and the shopping cart and at least one of neighboring autonomous platforms and neighboring shopping carts.

17. The residential community of claim 16, further comprising:
an electronic commerce algorithm to enable each occupier of each home of the residential community to place an order to purchase an item of the merchant through a neighborhood social network; and
a direction algorithm to communicatively direct the shopping cart associated with each occupier to at least one of the merchant and other neighbors of the residential community when the shopping cart is placed on the boarding location associated with each occupant based on a request of a particular occupier in control of a particular autonomous platform.

18. The residential community of claim 17 further comprising:
a message algorithm to automatically communicate a message to the merchant when the particular occupier places the order to purchase the item of the merchant,
wherein the message includes at least one of a description of the item, a location of the item, an identification of the particular occupier, a serial number of the particular autonomous platform, and a unique identifier of a particular shopping cart associated with the particular autonomous platform,
wherein the shopping cart arrives in an interior space of a particular home associated with the particular occupier through a gate through which the particular autonomous platform associated with the particular shopping cart is transportable, and
wherein the boarding location is located in the interior space of the home.

19. The residential community of claim 18:
wherein at least one of the particular autonomous platform and the particular shopping cart includes a light assembly such that the at least one of the particular autonomous platform and the particular shopping cart automatically provides lighting in when an ambient lighting level dips below a threshold value,
wherein a building of the merchant includes a product picker in a warehouse area of the merchant at which the item is loaded when the message is received,
wherein at least one of the particular autonomous platform and the particular shopping cart detects an obstacle when on a route between the particular home and the merchant, wherein the obstacle is at least one of a street, a pedestrian, and an object on the train track impeding progress of the at least one of the particular autonomous platform and the particular shopping cart,
wherein multiple different types of assemblies are attachable to the particular autonomous platform comprising any one of a box assembly, a carrier assembly, a locker assembly, and a person transporter rover assembly,
wherein the shopping cart is personal to the occupier, and wherein the residential community is a master planned community.

* * * * *